US011791956B1

(12) United States Patent
Xia et al.

(10) Patent No.: US 11,791,956 B1
(45) Date of Patent: Oct. 17, 2023

(54) GRANT-FREE OVERLAY DATA TRANSMISSIONS

(71) Applicant: Amazon Technologies, Inc., Seattle, WA (US)

(72) Inventors: Pengfei Xia, San Diego, CA (US); Duong Anh Hoang, San Diego, CA (US); Timothy Leo Gallagher, Woodinville, WA (US); Rod G. Fleck, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 2 days.

(21) Appl. No.: 17/544,800

(22) Filed: Dec. 7, 2021

(51) Int. Cl.
*H04L 5/00* (2006.01)
*H04B 7/185* (2006.01)

(52) U.S. Cl.
CPC ....... *H04L 5/0037* (2013.01); *H04B 7/18586* (2013.01); *H04L 5/0051* (2013.01)

(58) Field of Classification Search
CPC ............ H04B 7/18586; H04B 7/18582; H04B 7/18589; H04B 7/18591; H04B 7/18595; H04B 7/1858; H04B 7/18563; H04B 7/1853; H04B 7/18525; H04B 7/18526; H04L 5/0037; H04L 5/0032; H04L 5/003; H04L 5/0042; H04L 5/0044; H04L 5/0048; H04L 5/0051; H04L 5/0053; H04L 5/0058

See application file for complete search history.

(56) References Cited

U.S. PATENT DOCUMENTS

| 2017/0366251 | A1* | 12/2017 | Ravishankar | ...... | H04B 7/18513 |
| 2019/0327061 | A1* | 10/2019 | Li | .......... | H04L 1/0057 |
| 2020/0120693 | A1* | 4/2020 | Wu | .................. | H04W 72/1263 |
| 2021/0266123 | A1* | 8/2021 | Pianka | .................. | H04W 48/10 |
| 2021/0384964 | A1* | 12/2021 | Ravishankar | ........ | H04B 7/2643 |

FOREIGN PATENT DOCUMENTS

| CN | 114071609 | A | * | 2/2022 | |
| CN | 110034905 | B | * | 8/2022 | ........... H04L 1/1664 |
| DE | 112019002381 | T5 | * | 3/2021 | ........... H04J 11/0036 |
| EP | 3445119 | A1 | * | 2/2019 | ........... H04L 1/1685 |
| RU | 2524177 | C2 | * | 7/2014 | ............ G01S 19/04 |
| WO | WO-2021156825 | A1 | * | 8/2021 | |

* cited by examiner

*Primary Examiner* — Phong La
(74) *Attorney, Agent, or Firm* — Lowenstein Sandler LLP

(57) ABSTRACT

Technologies directed to grant-free transmission communication methodology and systems are described. One method includes determining first data that is associated with data transmission between a communication device and a first user terminal (UT). The method further includes determining, based on the first data, second data. The second data indicates communication resources associated with an uplink to the communication system that is allocated to the first UT. The second data further indicates that the communication resources are available for sending additional data by other non-scheduled UTs. The method further includes sending the second data to the first UT and receiving third data using the communication resources. The method further includes identifying a first portion of the third data that is associated with data transmission by a second UT. The method further includes identifying a second portion of the third data that is associated with data transmission by the first UT.

18 Claims, 13 Drawing Sheets

700A

| NOMA Format | O1 | O2 | O3 | O4 | O5 | O6 | O7 |
|---|---|---|---|---|---|---|---|
| 710 Number of NOMA OFDM symbols | 15/16 | 15/16 | 15/16 | 15/16 | 15/16 | 15/16 | 15/16 |
| 712 Number of CRC bits | 12/16 | 16/16 | 12/16 | 16/16 | 12/16 | 16/16 | 12/16 |
| 714 Number of subcarrier per symbol | 4 | 8 | 12 | 16 | 20 | 24 | 28 |
| 716 Payload bytes (ex. CRC) | 6/6 | 13/14 | 21/22 | 28/30 | 36/38 | 43/46 | 51/54 |

| NOMA Format | O4 | O5 | O6 | O7 |
|---|---|---|---|---|
| 762 Payload Bytes (ex. CRC) | 30 | 38 | 46 | 54 |
| 764 Raw Thrupt (not incl. preamble) r. t. A0 | 0.94x | 1.19x | 1.44x | 1.69x |
| 766 Net Thrupt (incl. preamble) r. t. A0 | 2.50x | 3.17x | 3.83x | 4.50x |

FIG. 7B

GRANT-FREE OVERLAY DATA TRANSMISSIONS

BACKGROUND

A satellite may provide communication service to many user terminals (UTs). These user terminals may be in contention with one another for use of an uplink to send data from individual user terminals to the satellite.

BRIEF DESCRIPTION OF DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 7A illustrates a table that indicates parameter specification associated with schedule messages and NOMA messages, according to some implementations.

FIG. 7B illustrates a table that indicates a parameter specification comparison between NOMA signal communication with and without grant-free overlay transmission, according to some implementations.

Figure 1A:
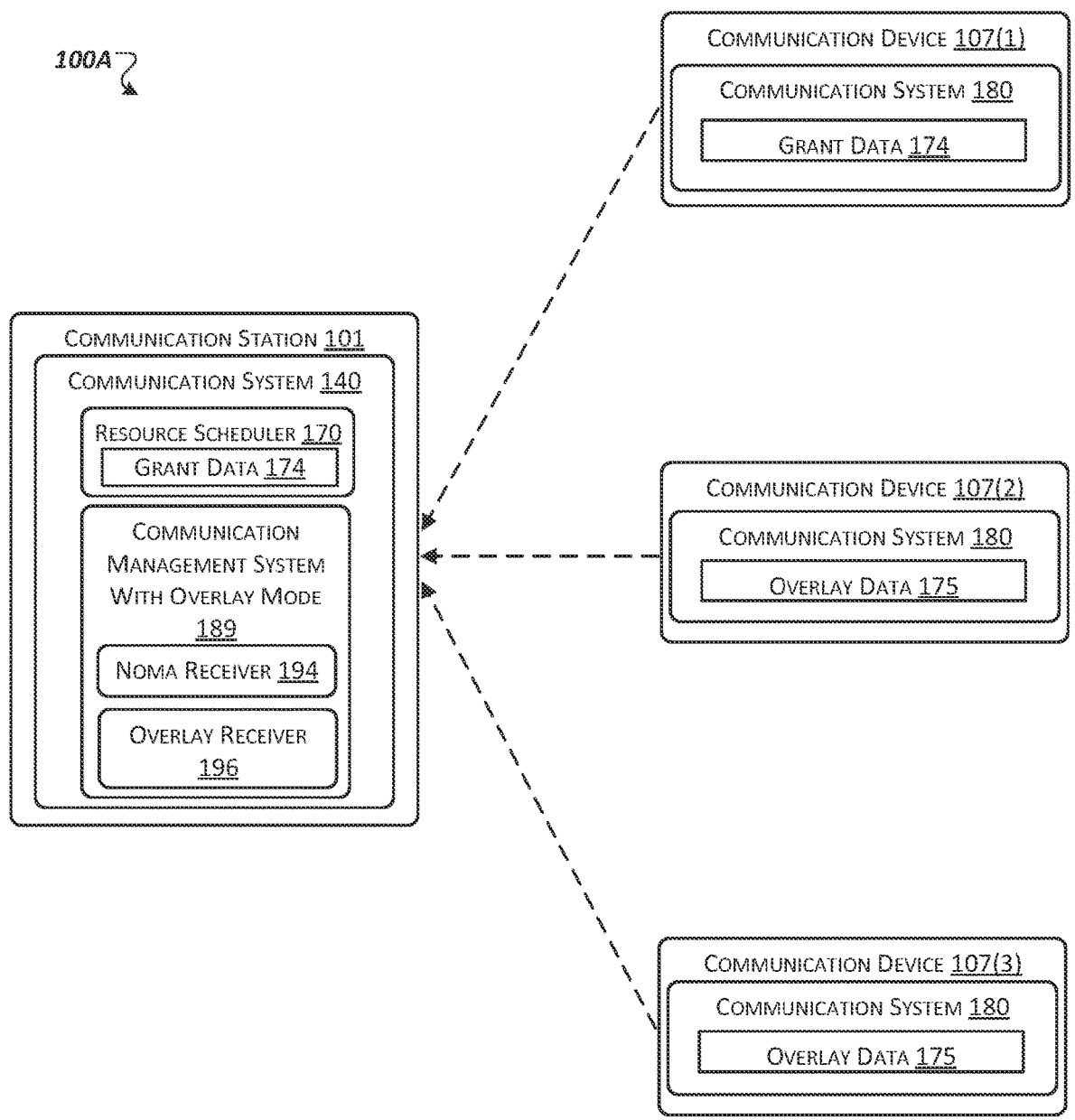
FIG. 1A illustrates a system that uses a communication management system with overlay mode to manage contention by communication devices for uplink resources, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A communications system may utilize satellites to wirelessly transfer data between user terminals and ground stations that in turn connect to other networks, such as the Internet. Compared to terrestrial wireless systems, the cost to place and maintain individual satellites, the large geographic coverage area of a given satellite, and a substantial number of user terminals served by each satellite, may result in an oversubscribed network that includes several congestion points that restrict the flow of network traffic. One congestion point is an uplink to the satellite, as many individual user terminals contend with each other to use the uplink to send data to the satellite.

The satellites provide communication services between devices, such as user terminals (UT) located on or near a body such as the Earth. For example, a first UT on a first geographic location (geolocation) on the Earth may send upstream data to a first satellite (e.g., artificial satellite, aerial vehicle, etc.) that is in range of the first UT. The first satellite may send the upstream data to a ground station, another satellite, and so forth. For example, the first satellite may send the upstream data to a ground station that in turn sends the upstream data to a point-of-presence (PoP) system 146. The PoP system 146 may then send the upstream data to a device on another network, such as a server on the Internet. The PoP system 146 may include an artificial demarcation point or network interface point between the communicating entities (e.g., satellite 102(1) and satellite 102(2)).

Likewise, downstream data destined for the first UT may be received at the PoP system 146. The PoP system 146 sends the downstream data to the ground station that in turn sends the downstream data to the first satellite. The first satellite then sends the downstream data to the first UT. For ease of illustration, and not necessarily as a limitation, a satellite may be deemed "in range" of a UT when communication may take place. For example, a satellite may be in range when it is within line of sight of the UT, a distance between the satellite and the UT is less than a threshold distance, the UT is within a footprint of an antenna onboard the satellite, and so forth. One of the factors that determine how long a satellite is within range of the UT is the orbital period of the satellite, which is determined by the altitude of the satellite.

The period, or duration, of an orbit varies depending upon the altitude of the satellite with respect to the body, eccentricity of the orbit, and so forth. For example, a satellite at an altitude of 600 kilometers (km) will take approximately 96 minutes to complete a circular orbit around the Earth. Depending on a variety of factors, including the curvature of the Earth, a satellite may be in range of a particular UT for only a few minutes. This results in a UT being frequently handed off from one satellite to another to maintain continuous communication services. In comparison, a geosynchronous satellite has an orbital period that coincides with the rotation of the earth, so a geosynchronous satellite appears to remain motionless with respect to the earth. While the apparent motionlessness with respect to the UT removes the need for handoffs, other drawbacks associated with the geosynchronous satellite remain.

Signals between the UT and the satellite are limited to traveling at the speed of light. The farther away a satellite is from the UT, the longer it takes for a signal to travel to the satellite and then travel back to Earth. For example, a hop (sending a signal to the satellite and back down to the ground, or vice versa) to a geosynchronous satellite introduces a delay of at least 240 milliseconds (ms). Additional delays due to signal processing, buffering, and so forth are also present. Such delays, or latency, are undesirable for many types of communication. For example, a real-time voice call in which there is a ¼ second delay can be aggravating. Likewise, time-sensitive communication activities such as remote control of devices, industrial reporting and control, gaming, and so forth may be adversely affected by these latencies. In comparison, a hop involving a non-geosynchronous orbit (NGO) artificial satellite at an altitude of 600 km only introduces about 4 ms of latency comprising 2 ms up to the satellite and 2 ms down to the UT. However, the latency does vary as distance to the NGO satellite changes. As a result, compared to using geosynchronous satellites, the use of NGO satellites significantly reduces latencies due to signal travel times.

Using a constellation of many NGO satellites offers significant benefits compared to a geosynchronous satellite. Latency is dramatically reduced, improving usefulness for communication. Shorter distances between the UT and the satellite allow for increased UT density by allowing greater frequency re-use and sharing. Power and antenna gain requirements for both the UT and the satellites are also reduced due to the shorter distances, compared to communication using geosynchronous satellites. This allows for relatively smaller and less expensive satellites to be used.

While the latency introduced by propagation delay in an NGO satellite is less than that of geosynchronous satellites, the dynamic nature of the network using many NGO satellites introduces factors that complicate contention for an uplink to a satellite. For example, as mentioned earlier, an individual satellite is only within the communication range of a UT for a few minutes. Efficient management of the uplink becomes particularly important in this dynamic environment as poor management reduces throughput on the uplink. Reduced throughput may result in data being delayed, dropped, or other unacceptable outcomes.

Traditional techniques of managing an uplink are not intended for and so do not scale well to large numbers of UTs, particularly when those UTs are sending large quantities of data. For example, a sparse number of terminals in a conventional satellite system may each be assigned fixed uplink resources in advance. However, this system is inflexible and results in unused capacity in the event a UT has no data to send. In another example, a sparse number of terminals making relatively short transmissions may attempt to use the uplink by transmitting at any time. However, this approach fails as the number of UTs transmitting on the uplink increases, the duration of transmissions increase, or both. As a result, traditional techniques of managing an uplink are infeasible in a large satellite network that may involve thousands of satellites and millions of UTs.

Aspects of the present disclosure overcome deficiencies of conventional interference by providing a satellite uplink management system that uses an overlay mode in connection with grants of uplink resources. A UT may use a random access channel (RACH) implementing a non-orthogonal multiple access (NOMA) scheme to send a short data message such as a short buffer data status (SBDS) message to the satellite. The SBDS is relatively short, such as 8 bits in length, minimizing the overall size of the data transmitted. The SBDS provides information about a characteristic of the upstream data enqueued for transmission, such as priority, and the approximate amount of upstream data enqueued for transmission on the uplink. This short length of the SBDS minimizes the use of the RACH while still permitting operation in a NOMA channel in which transmission of multiple SBDS transmissions may overlap one another in time and frequency. Responsive to the SBDS, a resource scheduler onboard the satellite may issue a grant. The grant specifies communication resources for the uplink that are assigned to the UT, such as a timeslot, frequency slot, modulation, coding scheme, and so forth. The use of the SBDS also substantially reduces overall latency by having a single transmission from the UT inform the satellite, compared to other multi-step techniques. During operation, the UT may continue to receive upstream data to send to the satellite. The UT may send long buffer data status (LBDS) messages to the satellite. The LBDS may comprise more detailed information about the characteristics of, and amount of, upstream data. This additional information assists the resource scheduler onboard the satellite in determining the solicited grants that maintain desired service level specifications for the different characteristics of upstream data. The LBDS messages may be sent to the satellite using the previously granted uplink communication resources, avoiding the need to send a request using the RACH, and thus reducing congestion on the RACH.

When issuing the grant to a scheduled UT, the satellite can mark the grant (or the granted time-frequency resource to be exact) as overlay-able. When a grant is marked overlay-able, the grant indicates that the communication resources allocated to the scheduled UT are also available for use by other non-scheduled UTs to send additional data (referred to as overlay data). The grant can indicate that the communication resources, although scheduled for the scheduled UT, can be used for sending overlay data by one or more non-scheduled UTs concurrently under the grant. When issuing the grant to a scheduled UT, the satellite can decide not to allow overlay data to be sent as well.

Aspects of the present disclosure can substantially improve the efficiency of a communication system using a satellite constellation. Aspects of the present disclosure can reduce uplink contention and improve throughput by allowing non-scheduled UTs to use communication resources already allocated to a scheduled UT by a grant. Aspects of the present disclosure can reduce latency by allowing UTs to send upstream data with less delay. Aspects of the present invention can improve signal distinguish and identification in the presence of multiple overlaid signals such as in a NOMA communication scheme. Aspects of the present disclosure can improve channel estimation and phase tracking in the uplink receivers. Aspects of the present disclosure can balance the degradation of a scheduled user and low-latency throughput of one or more non-scheduled users. Aspects of the present disclosure allow an uplink receiver to receive data and detect and decode a first portion of the data associated with one or more non-scheduled users and decode a second portion of the data associated with a scheduled user. It can be said that the non-scheduled portion is overlaid on the scheduled portion.

FIG. 1A illustrates a system 100A that uses a communication management system with overlay mode 189 to manage contention by communication devices 107 for uplink resources, according to some implementations. The system 100A shown here comprises a communication station 101 and multiple communication devices 107. The communication stations 101 may include one or more features, aspects, and/or details of satellite 102 and/or ground stations 106 as discussed in association with FIG. 1B. The communication devices 107 may include one or more features, aspects, and/or details of user terminals 108 of FIG. 1B.

The communication station 101 may include a communication system 140 used to communicate with the one or more communication devices 107. The communication device may be connected to one or more external communication networks (not shown). The communication system 140 includes a resource scheduler 170. The resource scheduler 170 schedules resources to provide communication to the UTs 108. The resource scheduler 170 may also specify communication parameters such as frequency, timeslot indicative of when transmission is permitted, and so forth. During operation, the resource scheduler may use information about the system such as system status, upcoming scheduled transmission, data associated with one or more of communication devices 107, and so forth.

The communication devices 107 each include a communication system 180, such as a satellite network interface, to establish communication with one or more satellites 102. The communication system 180 of the communication device 108 may include components similar to those of a communication system of a satellite 102 and may perform similar communication functionalities as discussed in FIG. 1B.

The communication system 180 of the communication devices 107 communicates with communication station 101. The communication devices 107 can communicate in an overlay mode (NOMA mode) and a scheduled mode. Additional details of the satellite uplink management system with the overlay mode are described below and with respect to FIGS. 2-8.

In a scheduled operational mode, communication between communication devices 107 and communication 101 proceeds with each communication device 107 attempting to communicate with the communication station 101 sends a scheduling request in the uplink to the communication station 101. The scheduling request may communication resources such as time-frequency resources used as well as an uplink propagation delay. The communication station grants unique communication resources to each communication device 107 using a downstream data (e.g., a downlink control message) or grant data 174. Associated with the grant (e.g., encapsulated in the downlink control message) is the communication resources used to transmit. The communication device 107(1) who receives the grant data 174 initiates real transmission on the granted communication resources.

A new overlay transmission may be used by unscheduled communication devices or devices that have not received an express grant of allocated communication resources may communicate using transmission overlay or overlaid signals. For example, communicate device may acquire grant data 174. At a near temporal moment a second (or more than two) communicates device(s) 107(2), 107(3), . . . etc. may elect to transmit overlay data 175 using the same communication resources as allocated to the first communication device in grant data 174.

As shown in FIG. 1A, the communication system may include a communication management system with an overlay mode 189. The communication manage system may include a NOMA receiver 194 and an overlay receiver 196. Additional details of these receivers are described below with respect to FIGS. 4-5.

The resulting signal from each of the communication devices may be aggregated at the communication system of communication station 101. The communication station 101 may identify individual portion of the received data and attributed them to individual communication devices. In some embodiments, the communication system 140 may substrate signal responsive to identifying them. The communication may effectively receive and process data from unscheduled communication devices without express grant of communication resources dedicated to the communication device 107.

The communication station 101, communication devices 107, or other systems described herein may include one or more computer devices or computer systems comprising one or more hardware processors, computer-readable storage media, and so forth. For example, the hardware processors may include application specific integrated circuits (ASICs), field programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks 144. For example, the transitory machine-readable signal may comprise transmission of software by the Internet.

Figure 1B:
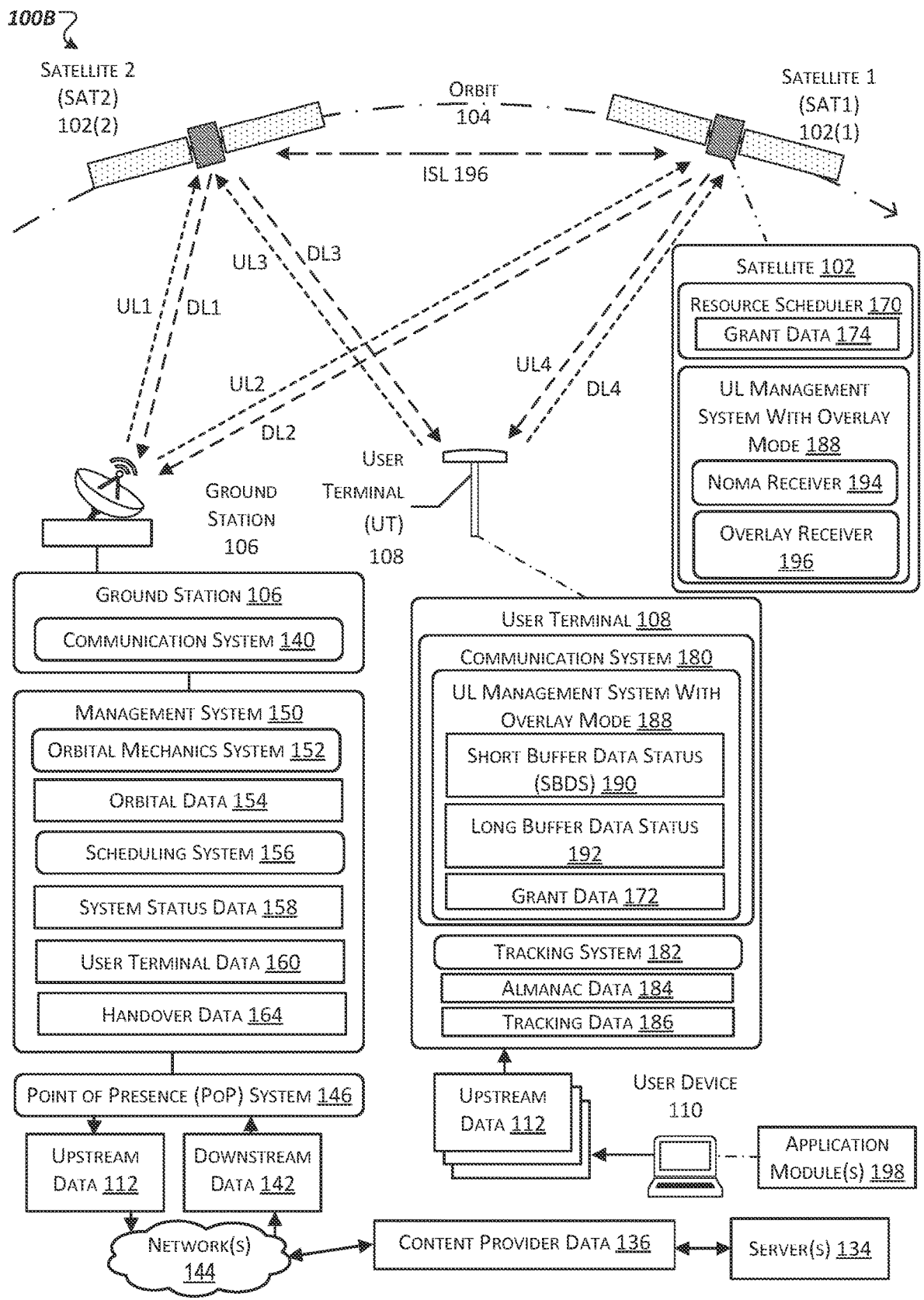
FIG. 1B illustrates a system that uses a satellite uplink management system with an overlay mode to manage contention by user terminals for uplink resources, according to some implementations.

FIG. 1B illustrates a system 100B that uses a satellite uplink management system 188 with an overlay mode to manage contention by user terminals for uplink resources, according to some implementations. The system 100B shown here comprises a plurality (or "constellation") of satellites 102(1), 102(2), . . . , 102(S), each satellite 102 being in orbit 104. Also shown is a ground station 106, user terminals (UTs) 108, and user devices 110. Each user device 110 may execute one or more application modules 198. For example, the application modules 198 may comprise email applications, telephony applications, videoconferencing applications, telemetry applications, web browser applications, and so forth.

The constellation may comprise hundreds or thousands of satellites 102, in various orbits 104. For example, one or more of these satellites 102 may be in NGOs in which they are in constant motion with respect to the Earth, such as a low earth orbit (LEO). In this illustration, orbit 104 is depicted with an arc pointed to the right. A first satellite (SAT1) 102(1) is leading (ahead of) a second satellite (SAT2) 102(2) in the orbit 104. The satellite 102 is discussed in more detail with regard to FIG. 2.

With regard to FIG. 1B, the uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link, which allows data to be sent from the satellite 102 to a ground station 106, UT 108, or device other than another satellite 102. For example, DL1 is a first downlink from the second satellite 102(2) to the ground station 106. The satellites 102 may also be in communication with one another. For example, an intersatellite link (ISL) 196 provides for communication between satellites 102 in the constellation. In some embodiments, one or more of the various features depicted in FIG. 1B is optional to carrying out all the features described herein.

One or more ground stations 106 are in communication with one or more satellites 102. The ground stations 106 may pass data between the satellites 102, a management system 150, networks 144 such as the Internet, and so forth. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground station 106 may also be connected to one or more communication networks 144. For example, the ground station 106 may connect to a terrestrial fiber optic communication network 144. The ground station 106 may act as a network gateway, passing data between the one or more communication networks 144 and the satellites 102. Such data may be processed by the ground station 106 and communicated via the communication system 140. The communication system 140 of a ground station 106 may include components similar to those of the communication system of a satellite 102 and may perform similar communication functionalities. For example, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 106 are in communication with a management system 150. The management system 150 is also in communication, via the ground stations 106, with the satellites 102 and the UTs 108. The management system 150 coordinates the operation of the satellites 102, ground stations 106, UTs 108, and other resources of the system 100B. The management system 150 may comprise one or more of an orbital mechanics system 152 or a scheduling system 156. The management system 150 may comprise one or more servers or other computing devices.

The orbital mechanics system 152 determines orbital data 154 that is indicative of a state of a particular satellite 102 at a specified time. In one implementation, the orbital mechanics system 152 may use orbital elements that represent characteristics of the orbit 104 of the satellites 102 in the constellation to determine the orbital data 154 that predicts location, velocity, and so forth of particular satellites 102 at particular times or time intervals. For example, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth.

The scheduling system 156 schedules resources to provide communication to the UTs 108. For example, the scheduling system 156 may determine handover data 164 that indicates when communication is to be transferred from the first satellite 102(1) to the second satellite 102(2). Continuing the example, the scheduling system 156 may also specify communication parameters such as frequency, timeslot indicative of when transmission is permitted, and so forth. These communication parameters may be associated with the operation of an uplink to the satellite 102, downlink from the satellite 102 to the UT 108, and so forth. During operation, the scheduling system 156 may use information such as the orbital data 154, system status data 158, user terminal data 160, and so forth.

The system status data 158 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of data. In another example, the system status data 158 may be indicative of future status, such as a satellite 102 being unavailable to provide communication service due to scheduled maneuvering, scheduled maintenance, scheduled decommissioning, and so forth.

The user terminal data 160 may comprise information such as a location of a particular UT 108. The user terminal data 160 may also include other information such as a priority assigned to data associated with that UT 108, information about the communication capabilities of that particular UT 108, and so forth. For example, a particular UT 108 in use by a business may be assigned a higher priority relative to a UT 108 operated in a residential setting. Over time, different versions of UTs 108 may be deployed, having different communication capabilities such as being able to operate at particular frequencies, supporting different signal encoding schemes, having different antenna configurations, and so forth.

The handover data 164 is indicative of information such as a UT identifier indicative of a particular UT 108, a handover time indicative of when a handover is to occur, a next satellite identifier (ID) that is indicative of the next satellite 102 that will be providing communication service to the specified UT 108, and so forth. The handover data 164 facilitates an orderly transition of the UT 108 from a first satellite 102(1) to a second satellite 102(2).

The resource scheduling system 156 may determine handover data 164 at regular intervals. For example, handover data 164 may be generated for handover assessment intervals that are five seconds long. In other implementations, the handover data 164 may be determined on demand, at irregular intervals, and so forth.

In one implementation, the handover data 164 may involve the resource scheduling system 156 using the orbital data 154 and the geolocation of the UTs 108 to determine which UTs 108 will be moving out of range of the satellites 102 currently providing communication services to those UTs 108. Based on the orbital data 154 and the geolocation of each UT 108, the next satellite 102 may be determined. For example, this may be a satellite 102 that is already in range, or will be in range, at the handover time. In some implementations, the handover data 164 may include a set of next satellites. For example, the handover data 164 may comprise a set of satellite IDs that indicate a primary satellite and a secondary satellite. Continuing the example, the second satellite 102(2) may be designated as the primary satellite expected to begin providing communication service to the UT 108 at the handover time. In the event the satellite 102(2) is unable to allocate resources to provide communication service to the UT 108, exception data indicative of this may be generated and provided to one or more of the network management system 150, the secondary satellite 102(3), the UT 108, or other devices. For example, the second satellite 102(2) may use an ISL 196 to send the exception data to the first satellite 102(1) and the secondary satellite 102(3). The first satellite 102(1) may send the exception data to the UT 108. The secondary satellite 102(3) may then allocate resources to provide communication service to the UT 108, and may subsequently provide the communication service beginning at the handover time.

In some implementations, the management system 150 may include an unsolicited grant system that accepts scheduling input data and determines unsolicited grant data. The unsolicited grant specifies communication resources for the uplink that are assigned to the UT, such as a timeslot, frequency slots, and so forth. The unsolicited grant may be issued based on scheduling input data. The scheduling input data may comprise information about one or more of upstream data 112 or downstream data 142. For example, the unsolicited grant system of the management system 150 may analyze the upstream data 112 to a particular UT 108 and downstream data 142 from the particular UT 108 to determine the unsolicited grant data. In one implementation, a machine learning system may be trained to use the scheduling input data to determine if the UT 108 is likely to have upstream data 112 to transmit to the satellite 102. Based on the output from the machine learning system, an unsolicited grant may be issued.

In some implementations, the scheduling input data may include content provider data 136 that provides additional information about the data to be transferred. For example, content such as video content, streaming games, video calling, audio calling, and so forth, may be sent from a content provider server to a user device via the satellite and UT. This content may have a defined duration such as movie length, scheduling length of a video call, specified size of data, and so forth. Responsive to a request for content, a content provider may send the content provider data 136 that indicates an expected duration of the content, expected downlink data rate, expected uplink data rate, and so forth. The resource scheduler 170 uses the content provider data 136 to issue unsolicited grant data. For example, unsolicited grants may be issued that are expected to be sufficient for upstream data, such as acknowledgment messages, to be returned to the server. Unsolicited grants may reduce the need to send SBDS using the RACH, thus reducing congestion on the RACH. Unsolicited grants may reduce the need to send the LBDS, thus reducing consumption of the uplink resources. Unsolicited grants also produce substantial reductions in overall latency. For example, to send upstream data with a solicited grant in this system, the UT sends a message (such as the SBDS or the LBDS), which travels to the satellite, is processed, and the solicited grant then travels back to the UT. In comparison, with the unsolicited grant, the unsolicited grant is used to send the upstream data.

With regard to these various techniques, the UT remains able to use the RACH to request additional uplink resources as called for by changing conditions. For example, if the UT receives additional upstream data having a highest priority, SBDS may be sent to the satellite to request additional solicited grants. The techniques may thus be operating concurrently, with solicited grants from SBDS, solicited grants from LBDS, unsolicited grants based on scheduling input data, and so forth.

During operation of the system 100B, communication services provided to a UT 108 may be handed off from a first satellite 102(1) to a second satellite 102(2). In some implementations, one or more of the scheduling input data or data based thereon may be transferred to the second satellite 102(2). For example, content provider data 136 may be sent to the resource scheduler 170 executing on a satellite 102(2) that is scheduled to provide communication service to the UT 108. In some implementations, the scheduling input data may comprise state data associated with the operation of the resource scheduler 170, parameters of the machine learning system, and so forth.

The unsolicited grant data is indicative of one or more parameters associated with uplink communication between the UT 108 and the satellite 102. For example, the unsolicited grant data may indicate the satellite identifier, uplink frequency, assigned timeslot, signal encoding, and so forth.

The unsolicited grant system of the management system 150 may send the unsolicited grant data to the satellite 102 that is in communication with the UT 108. In one implementation, a resource scheduler 170 onboard the satellite 102 may then allocate uplink communication resources consistent with the unsolicited grant data and then send the unsolicited grant data to the UT 108. In another implementation, the resource scheduler 170 onboard the satellite 102 may receive first unsolicited grant data from the management system 150 and generate second unsolicited grant data. For example, the second unsolicited grant data may specify a particular frequency, timeslot, and so forth that is not specified in the first unsolicited grant data.

The resource scheduler 170 onboard the satellite 102 may use scheduling input data to determine grant data 174 that allocates communication resources associated with the uplink to the satellite 102. The grant data 174 may comprise the unsolicited grant data or solicited grant data. Once determined, the grant data 174 is provided to the UT 108. The unsolicited grant data is provided to the UT 108 without request. In comparison, the solicited grant data is provided in response to a message from the UT 108.

The satellite uplink management system with the overlay mode 188, onboard the satellite 102, may use multiple receivers, including a NOMA receiver 194 and an overlay receiver 196. Additional details of these receivers are described below with respect to FIGS. 4-5.

During operation of the system, a UT 108 is handed off from a first satellite 102(1) to a second satellite 102(2). In one implementation, state data indicative of a state of a resource scheduler 170(1) of the first satellite 102(1) may be sent to a resource scheduler 170(2) of the second satellite 102(2). In another implementation, the management system 150 may provide state data to the resource scheduler 170(2) of the second satellite 102(2).

The UT 108 includes a communication system 180, such as a satellite network interface, to establish communication with one or more satellites 102. The communication system 180 of the UT 108 may include components similar to those of a communication system of a satellite 102 and may perform similar communication functionalities. For example, the communication system 180 may include one or more modems, digital signal processors, power amplifiers, antennas (including at least one antenna that implements multiple antenna elements, such as a phased array antenna), processors, memories, storage devices, communications peripherals, interface buses, and so forth. The UT 108 passes data between the constellation of satellites 102 and the user device 110. The UT 108 may connect to the user device 110 using a second network interface. For example, the second network interface may comprise a wireless local area network, wired local area network, terrestrial wide area network, and so forth. The user device 110 may execute one or more application modules 198. The data includes upstream data 112 sent by the user device 110 or downstream data 142 that is addressed to the UT 108 or the user device 110. For example, during operation the application module 198 may send upstream data 112 and receive downstream data 142. The upstream data 112 and the downstream data 142 each may comprise header data and payload data. The UT 108 may be fixed or in motion. For example, the UT 108 may be used at a residence, business, or on a vehicle such as a car, boat, aerostat, drone, airplane, and so forth.

The communication system 180 of the UT 108 includes the satellite uplink management system with the overlay mode 188 that is used in connection with the satellite uplink management system with the overlay mode 188, onboard the satellite 102 to manage the uplink to the satellite 102. Additional details of the satellite uplink management system with the overlay mode 188 are described below and with respect to FIGS. 2-8.

The UT 108 includes a tracking system 182. The tracking system 182 uses almanac data 184 to determine tracking data 186. The almanac data 184 provides information indicative of orbital elements of the orbit 104 of one or more satellites 102. For example, the almanac data 184 may comprise orbital elements such as "two-line element" data for the satellites 102 in the constellation that are broadcast or otherwise sent to the UTs 108 using the communication system 180.

The tracking system 182 may use the current location of the UT 108 and the almanac data 184 to determine the tracking data 186 for the satellite 102. For example, based on the current location of the UT 108 and the predicted position and movement of the satellites 102, the tracking system 182 is able to calculate the tracking data 186. The tracking data 186 may include information indicative of azimuth, elevation, distance to the second satellite, time of flight correction, or other information associated with a specified time. The determination of the tracking data 186 may be ongoing. For example, the first UT 108 may determine tracking data 186 every 100 ms, every second, every five seconds, or at other intervals.

The UT 108 may send upstream data 112 using the system 100B. For example, the upstream data 112 may originate from the UT 108, or may be received by the UT 108 from a user device 110. The upstream data 112 may comprise a single packet or other unit of data transfer, or a plurality of packets or other units of data transfer. The upstream data 112 may be addressed to a device. The device that the upstream data 112 is addressed to may be accessible using one or more networks 144, such as the Internet.

The uplink may comprise a plurality of channels. A channel may be a particular combination of one or more of a frequency, time division, modulation, access modalities, and so forth. During operation of the UT 108, an uplink management system 188 may be used to determine one or more messages, such as a short buffer data status (SBDS) 190 or long buffer data status (LBDS) 192. The uplink management system 188 may send these messages using one or more of the channels.

The uplink may comprise a random access channel (RACH). The RACH may be random access in that individual UTs 108 may utilize the RACH on an ad hoc basis without prior knowledge of whether other UTs 108 may be transmitting at that time. The RACH provides the advantage of allowing for on-demand access to the satellite 102, increasing utilization. However, the RACH is susceptible to congestion if too many UTs 108 attempt to use the RACH at the same time. If the RACH is congested, messages from the UT 108 to the satellite 102 may not be received, may be retransmitted, and so forth. By using the techniques described herein, the size and quantity of messages sent using the RACH are reduced, substantially reducing congestion on the RACH. This allows a single satellite 102 to provide communication service to a large number of UTs 108.

The RACH may also implement other techniques, such as a non-orthogonal multiple access (NOMA) to the RACH. A NOMA architecture is able to operate when two or more transmissions at least partially overlap in time and space. For example, a NOMA architecture may operate on the uplink, allowing the UT 108 (2039) and a second UT (not illustrated in FIG. 2) to both send messages to the satellite 102(1) during the same time and using the same frequency(s). While NOMA reduces constraints with regard to time and frequency of transmission on the uplink, there are still limits with regard to congestion on the uplink. For example, performance in a system utilizing NOMA is improved if the individual messages being transmitted are relatively short, have a specified data format, and so forth. Reducing the size of the data sent in the NOMA reduces the time at which any number of transmitters may be simultaneously transmitting, simplifying the decoding process at the receiver. Likewise, the use of a specified data format further facilitates decoding.

The uplink may also include one or more grant channels. Depending upon the implementation, a UT 108 may be allocated one or more grant channels. A grant channel is specified by communication resources specified by the grant data 172. For example, grant data 172 may specify communication resources for the uplink that are assigned to the UT 108, such as a timeslot, frequency slot, modulation, coding scheme, and so forth. The resource scheduler 170 determines the grant data 172 that allocates these communication resources.

During operation, the uplink management system 188 may maintain one or more buffer groups. Each buffer group comprises a buffer queue to store upstream data 112 for transmission to the satellite 102 on the uplink. Each buffer group may be associated with an amount of data that is greater than or equal to zero. Each of these buffer groups may be associated with a particular characteristic. For example, the buffer groups may be associated with priority such that buffer group 0 is associated with highest priority data. Continuing the example, buffer group 5 may be associated with data having a lesser priority than buffer group 0. Priority for data in a buffer group may be determined based on a variety of factors, such as quality of service (QoS) flags for associated data, prior delays in transmission, and so forth. For example, the remaining unsent data in buffer group 7 at a first time may be moved to buffer group 4 at a second time.

The uplink management system 188 may use the RACH to send a message such as the short buffer data status (SBDS) 190 to the satellite. The SBDS 190 is relatively short, minimizing the overall size of the data transmitted. For example, the SBDS 190 may be 8 bits in length. This reduces transmission time, reducing contention on the RACH. In some implementations, the uplink management system 188 may send an SBDS 190 responsive to one or more buffer groups having an amount of data enqueued that exceeds a threshold value. For example, if no upstream data 112 has been enqueued for transmission, no SBDS 190 is sent.

The SBDS 190 provides information about upstream data 112 that a UT 108 has stored for transmission to the satellite 102 on the uplink. This information may include one or more of priority, approximate amount of that data, and so forth. The priority may be designated by a particular buffer group. In one implementation, the uplink management system 188 may indicate the highest priority buffer group that has a nonzero amount of data. For example, if eight levels of priority, or eight buffer groups, are specified in the system, 3 bits in the SBDS 190 may be used to indicate the highest priority buffer group that has a nonzero amount of data. The approximate amount of the data in the specified buffer group may be used to reduce the size of the SBDS 190. For example, if the SBDS 190 allocates 5 bits for approximate amount of data used, there are 32 possible "bins" of quantities of data that may be expressed. Continuing the example, bin 1 may specify an amount of data of 1-10 kb, bin 2 may be 11-100 kb, bin 3 may be 101-5000 kb, and so forth.

Responsive to the SBDS 190 indicating a non-zero amount of data to transfer, the resource scheduler 170 onboard the satellite 102 may issue grant data 172 such as solicited grant data 174. The solicited grant data 174 specifies communication resources for the uplinks that are assigned to the UT 108 that is associated with the SBDS 190. The UT 108 receives the solicited grant data 174, and sends the upstream data 112 that is associated with the SBDS 190. Continuing the example, at least some of the upstream data 112 stored in the specified buffer group may be transmitted.

During operation, the UT 108 may continue to receive or generate upstream data 112 to send to the satellite 102. The uplink management system 188 of the UT 108 may send long buffer data status (LBDS) 192 messages to the satellite 102. The LBDS 192 may comprise more detailed information about the priority and amount of upstream data 112 that has been stored for transmission, compared to the SBDS 190. This additional information in the LBDS 192 assists the resource scheduler 170 onboard the satellite 102 in determining the solicited grant data 174 that maintains desired service level specifications for the different priorities of upstream data 112. For example, the LBDS 192 may comprise a first octet that indicates which of the specified buffer groups have a nonzero amount of data for transmission. The LBDS 192 also includes detailed information about the amount of data in the specified buffer groups. For example, additional octets may be used, one octet comprising data indicative of the amount of data stored in that buffer group.

In some implementations, the LBDS 192 messages may be sent to the satellite 102 using the previously granted uplink communication resources. This avoids the need to send an additional request using the RACH, and thus reducing congestion on the RACH.

The various techniques described in this disclosure may operate concurrently with one another. For example, an SBDS 190 may be sent using the RACH while other upstream data 112 is being sent on the uplink using solicited grant data 174 responsive to LBDS 192 or unsolicited grant data.

The system 100B may include one or more PoP systems 146. Each PoP system 146 may comprise one or more servers or other computing devices. Separate PoP systems 146 may be located at different locations. In one implementation, a PoP system 146 may be associated with providing service to a plurality of UTs 108 that are located in a particular geographic region.

The PoP systems 146 may manage communication between the system 100B and the network 144. For example, a first PoP system 146 may receive the upstream data 112 and send that upstream data 112 to the network 144. In another example, the first PoP system 146 may receive the downstream data 142 and proceed to attempt delivery of the downstream data 142 to the UT 108.

The PoP system 146 is in communication with one or more ground stations 106(1), 106(2), . . . , 106(G) and the management system 150. In some implementations, one or more functions may be combined. For example, the PoP system 146 may perform one or more functions of the management system 150. In another example, the PoP system 146 may be included in an integrated ground station 106.

One or more servers 134 may communicate with the POP system 146 via the network(s) 144. The servers 134 may provide various functions, such as content delivery, navigation, data storage and retrieval, and so forth. For example, the servers 134 may store video content that may be requested and streamed to a user device 110. In some implementations the servers 134 may provide content provider data 136. The content provider data 136 may be used by the unsolicited grant system 166, resource scheduler 170, or other portions of the system 100B to facilitate operation. For example, the unsolicited grant system 166 or the resource scheduler 170 may determine and send unsolicited grant data to a UT 108 based on the content provider data 136.

The satellite 102, the ground station 106, the user terminal 108, the user device 110, the management system 150, the PoP system 146, or other systems described herein may include one or more computer devices or computer systems comprising one or more hardware processors, computer-readable storage media, and so forth. For example, the hardware processors may include application specific integrated circuits (ASICs), field programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks 144. For example, the transitory machine-readable signal may comprise transmission of software by the Internet.

Figure 2:
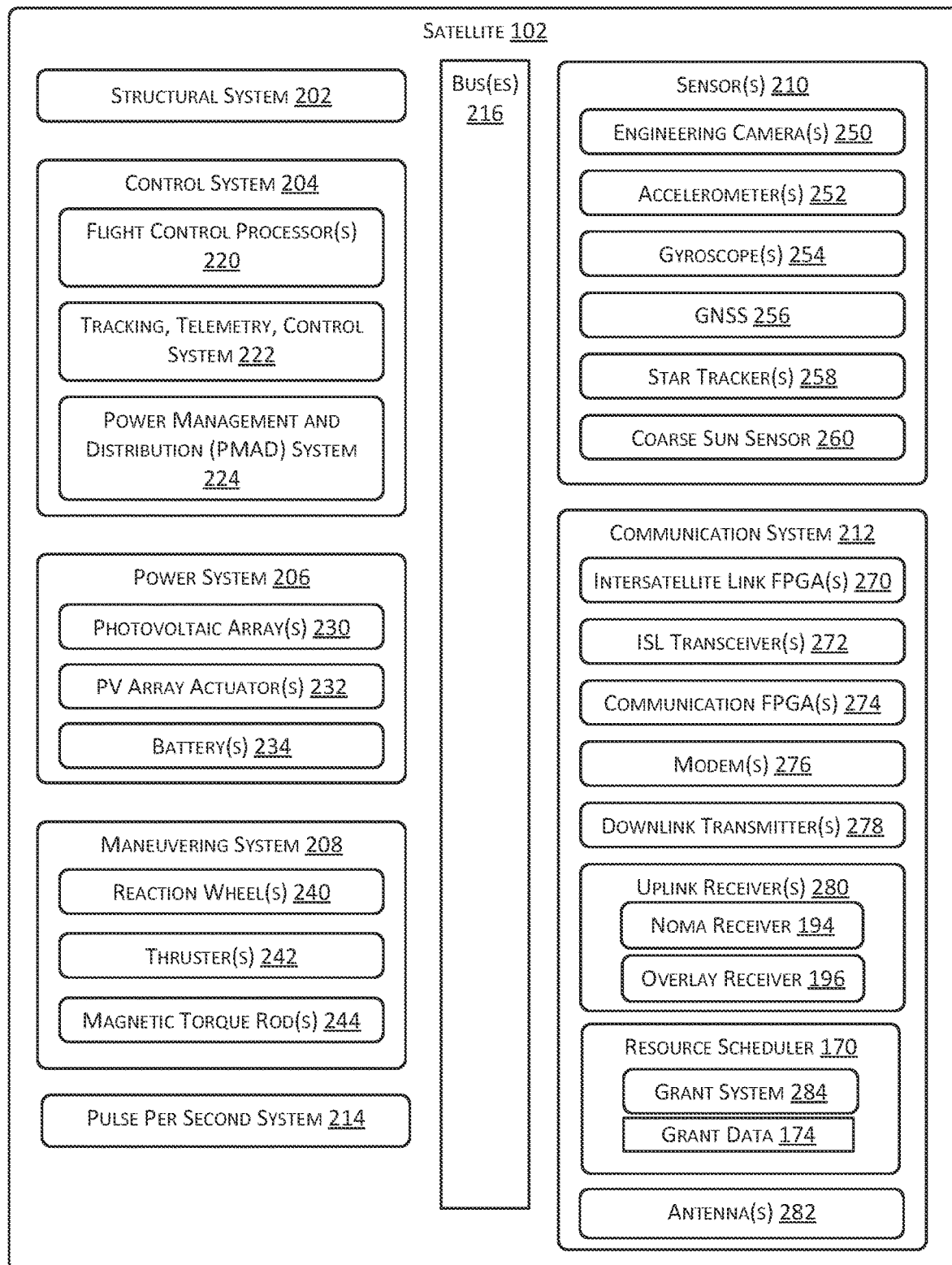
FIG. 2 is a block diagram of some systems associated with the satellite, according to some implementations.

FIG. 2 is a block diagram 200 of some systems associated with the satellite 102, according to some implementations. The satellite 102 may comprise a structural system 202, a control system 204, a power system 206, a maneuvering system 208, one or more sensors 210, and a communication system 212. A pulse per second (PPS) system 214 may be used to provide timing reference to the systems onboard the satellite 102. One or more buses 216 may be used to transfer data between the systems onboard the satellite 102. In some implementations, redundant buses 216 may be provided. The buses 216 may include, but are not limited to, data buses such as Controller Area Network Flexible Data Rate (CAN FD), Ethernet, Serial Peripheral Interface (SPI), and so forth. In some implementations the buses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operations of the communication system 212. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operations of the power system 206, control distribution of power to the systems of the satellite 102, control battery 234 charging, and so forth.

The power system 206 provides electrical power for operations of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more PV array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters 242 may expend propellent. For example, an electrothermal thruster may use water as propellent, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations, the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 212 provides communication with one or more other devices, such as other satellites 102, ground stations 106, user terminals 108, and so forth. The communication system 212 may include one or more modems 276, digital signal processors, power amplifiers, antennas (including at least one antenna that implements multiple antenna elements, such as a phased array antenna) 282, processors, memories, storage devices, communications peripherals, interface buses, and so forth. Such components support communications with other satellites 102, ground stations 106, user terminals 108, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 212 may be output to other systems, such as to the control system 204, for further processing. Output from a system, such as the control system 204, may be provided to the communication system 212 for transmission.

Each satellite may use one or more antennas 282 or antenna elements to provide a beam for transmission and reception of radio signals. For example, the satellite 102 may have a phased array antenna that allows for gain in a particular direction. Compared to a non-directional radiator, this gain directs the energy of transmitted radio frequency signals in that particular direction. This increases the strength of the signal at a receiver in the UT 108, ground station 106, and so forth. Likewise, the gain results in improved received signal strength at the satellite 102.

The beam provided by the satellite 102 may comprise a plurality of sub-beams. Subbeams on a satellite 102 may use different frequencies, timeslots, and so forth, to communicate with the UT 108. Each subbeam provides coverage of a particular geographic area or "footprint". Compared to a single beam, subbeams provide several advantages. For example, by using subbeams, radio frequencies may be reused by the same satellite 102 and other satellites 102 to service different areas. This allows increased density of UTs 108 and bandwidth.

During a pass over of a particular location on the Earth, each subbeam may be targeted to a geographic location on the Earth. While that target geographic location is in range of the satellite 102, the subbeam tracks the target location. As the satellite 102 moves in orbit 104, the boundary of the footprint may change due to the relative angle between the satellite 102 and the Earth. For example, the footprint boundary may change from approximately an oval shape while the satellite 102 is low on the horizon relative to the target location, a circular shape while directly overhead, then an oval shape as the satellite 102 nears the opposite horizon. As the satellite 102 moves, a subbeam may be retargeted to another target location. In this configuration, instead of the subbeam sweeping along the ground track of the satellite 102, the subbeam loiters on a first area relative to the Earth, then is redirected to a second area.

In some implementations, a particular modem 276 or set of modems 276 may be allocated to a particular subbeam. For example, a first modem 276(1) provides communication to UTs 108 in a first geographic area using a first subbeam while a second modem 276(2) provides communication to UTs 108 in a second geographic area using a second subbeam.

The communication system 212 may include hardware to support the intersatellite link 196. For example, an intersatellite link FPGA 270 may be used to modulate data that is sent and received by an ISL transceiver 272 to send data between satellites 102. The ISL transceiver 272 may operate using radio frequencies, optical frequencies, and so forth.

A communication FPGA 274 may be used to facilitate communication between the satellite 102 and the ground stations 106, UTs 108, and so forth. For example, the communication FPGA 274 may direct operation of a modem 276 to modulate signals sent using a downlink transmitter 278 and demodulate signals received using an uplink receiver(s) 280. The uplink receiver(s) 280 can include the NOMA receiver 194 and the overlay receiver 196. Additional details of the uplink receiver(s) 280 are described below. The satellite 102 may include one or more antennas 282. For example, one or more parabolic antennas may be used to provide communication between the satellite 102 and one or more ground stations 106. In another example, a phased array antenna may be used to provide communication between the satellite 102 and the UTs 108.

The communication system 212 may include a resource scheduler 170 that specifies uplink resources for a UT 108 to communicate with the satellite 102. The resource schedule 170 may include one or more of a grant system 284 (or separate grant systems for solicited grants and unsolicited grants. For example, the communication FPGA 274 may process a message such as an SBDS 190 or LBDS 192 that is received from a UT 108 by the uplink receiver 280. Responsive to the message, and subject to the availability of communication resources associate with the uplink, the grant system 284 of the resource scheduler 170 executing on the communications FPGA 274 may determine solicited grant data 174. The unsolicited grant system 166 of the resource scheduler 170 may also determine and send unsolicited grant data based on the scheduling input data. The grant data 172 is then sent using the downlink transmitter 278.

The uplink receiver(s) 280 can include the NOMA receiver 194 and the overlay receiver 196. The uplink receiver(s) 280 may include one or more features, aspects, and/or details described in association with FIGS. 4-6 and performing one or more method operations in association with FIG. 3. For example, the uplink receiver 280 may include circuitry such as described in FIG. 4 for carrying out a grant free transmission mode of communication.

Figure 3A:
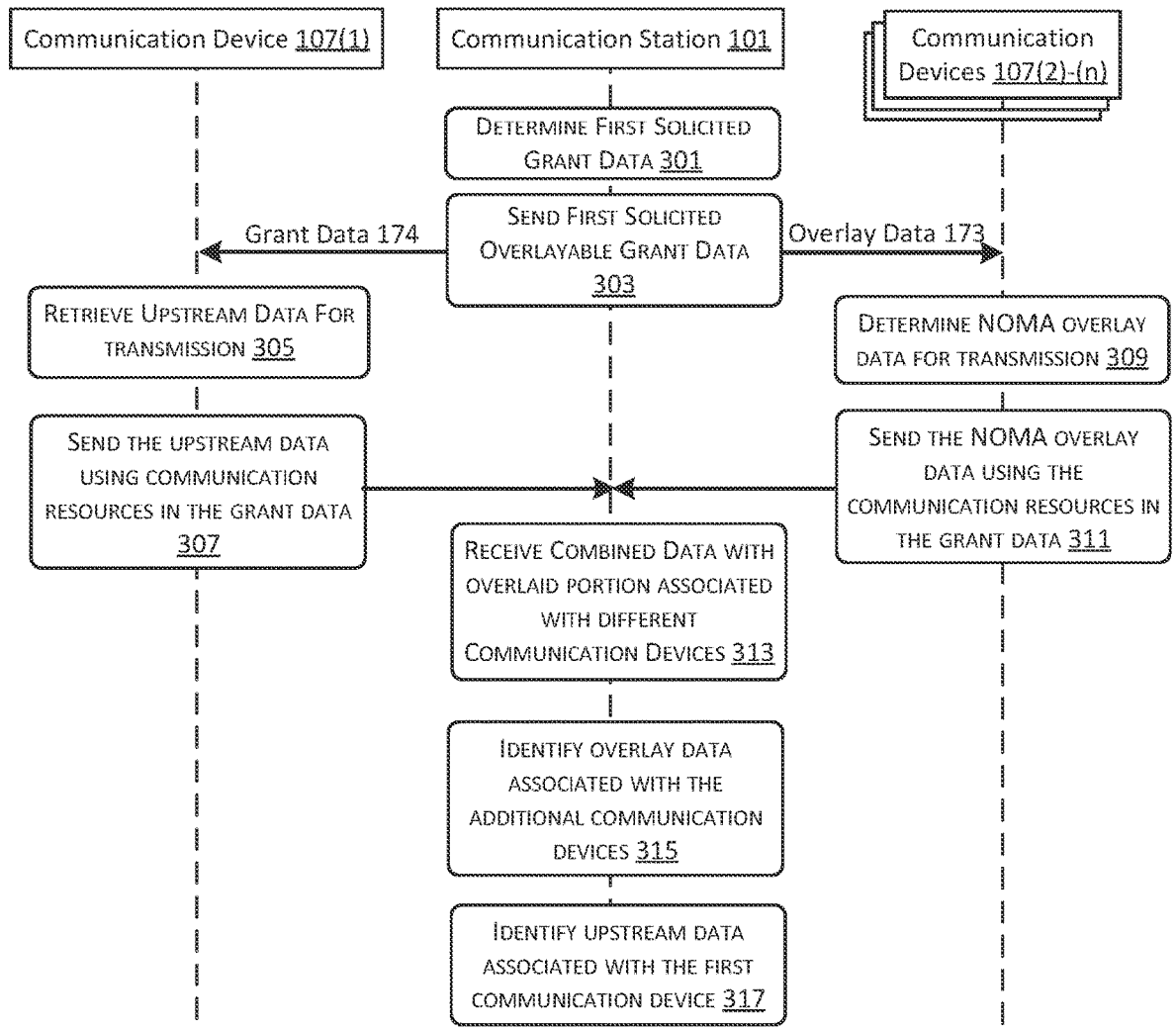
FIG. 3A illustrates a process of providing grant-free overlay transmissions, according to some implementations.

FIG. 3A illustrates a process 300A of providing grant-free overlay transmission, according to some implementations. Process 300A may be implemented by one or more UTs 108 or the satellite 102. In this illustration, time generally increases from top to bottom. For example, an operation depicted at the top of the page may occur before an operation depicted at the bottom of the page. In this illustration, the first UT 108(1) and the second UT 108(2) are in communication with the first satellite 102(1). Other elements of the system 100B are omitted from this illustration for clarity, and not as a limitation. In this illustrative example shown in FIG. 3A. UT 108(1) represent a scheduled user or a scheduled UT to perform a scheduled data transmission and UT108(1)-(n) represent one or more additional UTs that are configured to perform unscheduled data transmission or overlaid data transmission using granted resources allocated to UT 108(1).

At 301, the communication station 101 determines first solicited grant data 301. The first solicited grant data 301 may be determined responsive to receiving a data from a communication device 107(1) requesting allocation of communication resources. The grant data indicate communication resources including time and frequency data for a schedule data transmission.

At 303, the communication station 101 sends grant data (e.g., grant data 174 of FIGS. 1A-B) to communication device 107(1). Communication devices 107(2)-(n) may receive overlay data 175. Overlay data 175 may include an indication that communication resources associated with grant data 174 are overlay able or capable of be used to overlay one or more unscheduled data transmission with a scheduled data transmission.

At 305, communication device 107(1) (e.g., the scheduled communication device) retrieves upstream data for transmission. The upstream data may include details and/or features of upstream data 112.

At 307, communication device 107(1) sends the upstream data using communication resources in the grant data. For example, the communication resources may indicate a time and frequency to send the data and the communication device 107(1) transmits the upstream data according to the granted communication resources. The transmitted upstream data may be send using a scheduled message 602 as discussed in association with FIG. 6.

At 309, one or more other communication devices 107(2)-(n) (e.g., NOMA users or non-scheduled devices) determine one or more NOMA overlay data for transmission. The NOMA overlay data may include one or more features of NOMA message 604 discussed in associated with FIG. 6.

At 311, the one or more other communication devices 107(2)-(n) send the NOMA overlay data using the communication resources in the grant data 174. These unscheduled users transmit a message used the allocated resources for the communication device and transmit the data in a message format capable of being overlaid with a message format used by the communication device 107(1) to transmit the upstream data.

At 313, the communication station 101 receives data having a portion attributed to communication device 107(1) and one or more additional portions attributed to communication devices 107(2)-(n). In some embodiments, as will be discussed in greater detail in later embodiments, communication station 101 may perform a signal subtraction that iteratively removes portions of the received signal attributed to different communication devices 107.

At 315, the communication station 101 identifies the one more portions of data associated with the one or more additional communication devices 107(2)-(n). The communication station may include a NOMA baseband receiver (e.g., NOMA baseband Rx 502 of FIG. 5) and perform one or more functions described in association with FIGS. 4-5. For example the communication station 101 may subtract one or more data streams associated with the NOMA overlay data of the one or more additional communication devices 107(2)-(n).

At 317, the communication station 101 identifies a portion of the received overlaid signal associated with the first communication device. For example, the communication station 101 may identify the upstream data within the received combined overlaid data. The overlay data and the upstream may further be processed by downstream processes.

Figure 3B:
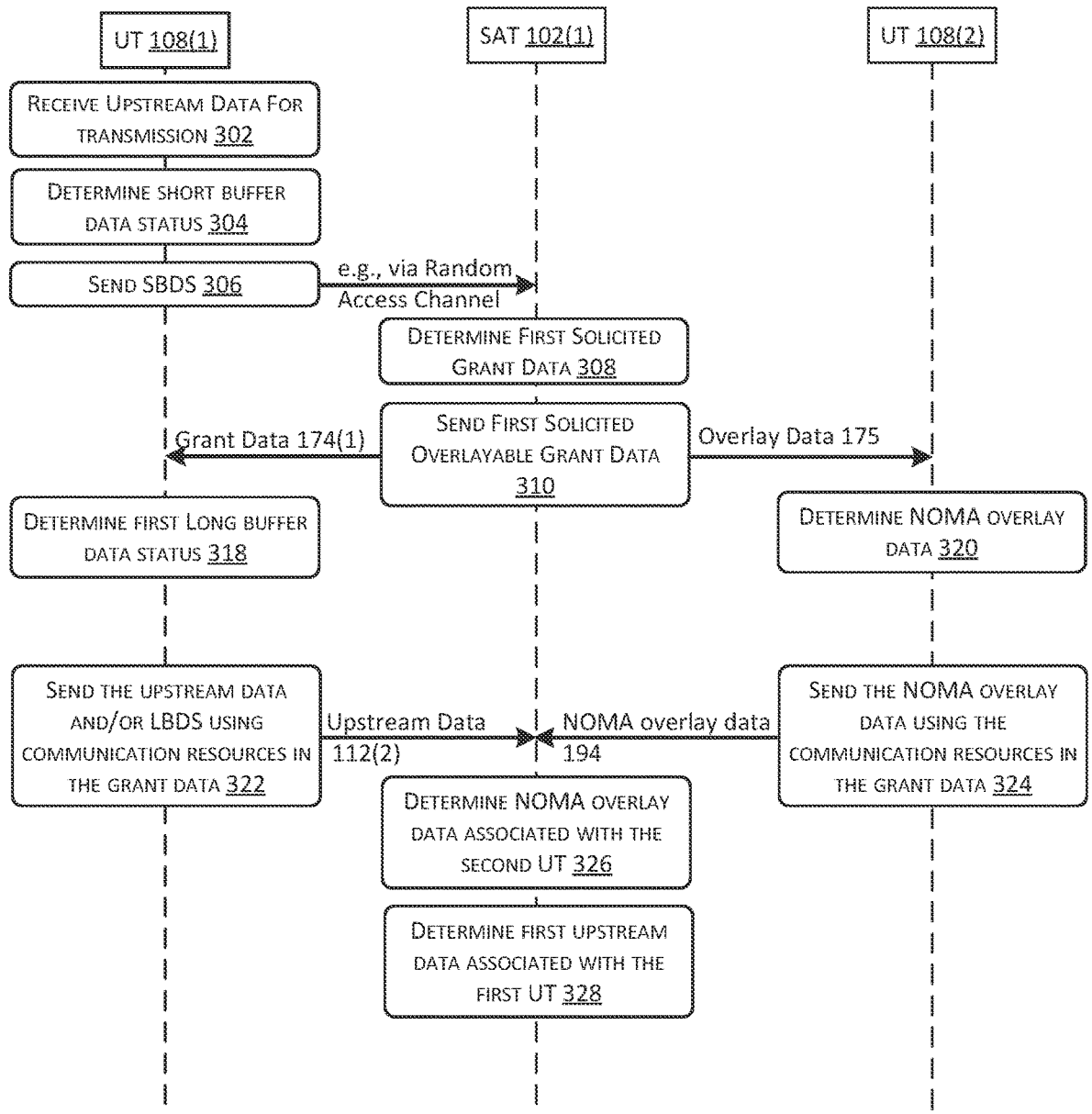
FIG. 3B illustrates a process of providing grant-free overlay transmissions, according to some implementations.

FIG. 3B illustrates a process 300B of providing grant-free overlay transmission, according to some implementations. Process 300B may be implemented by one or more UTs 108 or the satellite 102. In this illustration, time generally increases from top to bottom. For example, an operation depicted at the top of the page may occur before an operation depicted at the bottom of the page. In this illustration, the first UT 108(1) and the second UT 108(2) are in communication with the first satellite 102(1). In this illustrative example, the first UT 108(1) represents actions and features associated with a scheduled UT and the second UT 108(2) represent actions and features associated with a non-scheduled UT. FIG. 3B illustrate a single UT 108(2) representing actions and/or features of a non-scheduled UT. However, UT 108(2) may represent a plurality of non-scheduled UTs. Other elements of the system 100B are omitted from this illustration for clarity, and not as a limitation.

At 302, the first UT 108(1) receives or generates first upstream data 112(1) for transmission to the satellite 102. For example, the user device 110 may send data to the satellite 102 that has a destination address of a server 134. The first upstream data 112(1) may be stored in a buffer group of the first UT 108(1).

At 304 the first UT 108(1) determines SBDS 190. For example, the uplink management system 188 may determine the highest priority buffer group that has a nonzero amount of data stored therein. In other examples, characteristics other than priority may be used.

At 306 the SBDS 190 is sent from the first UT 108(1) to the satellite 102(1). For example, the first UT 108(1) may send the SBDS 190 using a random access channel (RACH) to the satellite 102(1). For example, A UT may use a random access channel (RACH) implementing a non-orthogonal multiple access (NOMA) to send a short buffer data status (SBDS) message to the satellite. The SBDS is relatively short, such as 8 bits in length, minimizing the overall size of the data transmitted. The SBDS provides information about a characteristic of the upstream data enqueued for transmission, such as priority, and approximate amount of upstream data enqueued for transmission on the uplink. This short length of the SBDS minimizes use of the RACH while still permitting operation in a NOMA channel in which transmission of multiple SBDS transmissions may overlap one another in time and frequency At 308, at the first satellite 102(1), the resource scheduler 170 determines first solicited grant data 174(1) based on the SBDS 190. For example, the resource scheduler 170 may process a plurality of SBDS 190 messages received from a plurality of UTs 108 and allocate uplink resources responsive to those messages. For example, responsive to the SBDS, a resource scheduler onboard the satellite may issue a grant. The grant specifies communication resources for the uplink that are assigned to the UT 108 (1), such as a timeslot, frequency slot, modulation, coding scheme, and so forth. The use of the SBDS can substantially reduce overall latency by having a single transmission from the UT 108 (1), compared to other multi-step techniques.

At 310, the first solicited overlayable grant data 174(1) is transmitted from the first satellite 102(1) to the first UT 108(1). This transmission can be received by one or more additional UTs including the second UT 108(2). In some embodiments, the overlay data 175 is received by UT 108(2) as a separate message from a message indicating grant data 174(1), however, in other embodiments the overlay data 175 is received by UT 108(2) within a message that also encapsulates grant data 174(1). For example, the overlay grant data may be generated and/or otherwise managed by UL management system with overlay mode 188. When issuing the grant to a scheduled UT, the satellite can mark the grant as overlay-able. When a grant is marked overlay-able, the grant indicates that the communication resources allocated to the scheduled UT are also available for use by other non-scheduled UTs to send additional data (referred to as overlay data). The grant can indicate that the communication resources, although scheduled for the scheduled UT, can be used for sending overlay data by one or more non-scheduled UTs concurrently under the grant. When issuing the grant to a scheduled UT, the satellite can decide not to allow overlay data to be sent as well.

At 318, the first UT 108(1) determines LBDS 192(1) data. For example, the uplink management system 188 may determine the buffer groups having nonzero quantities of data stored therein, and the amount of data in each. For example, the LBDS may comprise more detailed information about the characteristics of, and amount of, upstream data. This additional information assists the resource scheduler onboard the satellite in determining the solicited grants that maintain desired service level specifications for the different characteristics of upstream data. The LBDS messages may be sent to the satellite using the previously granted uplink communication resources, avoiding the need to send a request using the RACH, and thus reducing congestion on the RACH.

At 320, the second UT 108(2) determines NOMA overlay data 194. For example, the NOMA overlay data 194 may include encoded data indicating upstream data 112(3) having unique identifying information such as a preamble and convolution code identifying the second UT 108(2). The NOMA overlay data may include one or more aspects and/or features of overlay signals of FIG. 6.

At 322, the first upstream data is sent from the first UT 108(1) to the first satellite 102(1) using the communication resources specified in the first solicited grant data 174(1). For example, the communication system 180 may use the first solicited grant data 174(1) to send the first upstream data. In some embodiments, at 318, the LBDS 192 is sent from the first UT 108(1) to the satellite 102(1). The LBDS 192 may also be sent to the first satellite 102(1) using the granted channel of the communication resources specified in the first solicited grant data 174(1). In some implementations, the resource scheduler 170 may allocate in the grant data 172 sufficient uplink resources to transmit the LBDS 192, should the LBDS 192 be available. In some embodiments, at 322, the first upstream data 112(1) is sent from the first UT 108(1) to the first satellite 102(1) using the communication resources specified in the first solicited grant data 174(1) or additional solicited grant data (e.g., second solicited grant data 174(2).

At 324, the NOMA overlay data 194 is sent from the second UT 108(2) to the first satellite 102(1) using the communication resources specified in the first solicited grant data 174. The NOMA overlay data 194 may be received in conjunction with one or more of upstream data 112(1) and/or LBDS 192 sent from the first UT (1). For example, the first satellite 102(1) may receive a signal with a portion attributed to a first signal from the first UT 108 (1) (e.g., first upstream data 112(1)) and a second portion attributed to a second signal from the second UT 108 (2) (e.g., NOMA overlay data 195).

At 326, the satellite 102(1) determines NOMA overlay data 194 associated with the second UT 108(2). The satellite 102(1) may include processing circuitry for identifying the second UT from the received data, including a combination of the LBDS 192 and NOMA overlay data 194. The first satellite may determine a source identifier of a portion of the received signal by identifying an identification portion of the received data stream. For example, the NOMA overlay data 194 may include a unique identifying information (e.g., encoded unique identifying information) such as a preamble that uniquely identifies the UT 108 (2). As mentioned previously, in some embodiments, there may be multiple non-scheduled UTs. Each of the non-scheduled UTs may send data with unique identifying information in the form of a preamble. The preamble may be near orthogonal to other preambles of other NOMA overlay data that identify other transmitting device (e.g., distinguishable one from another). The received signal may include characteristics of scheduled message 602 and/or NOMA message 604 described in association with FIG. 6.

At 328, the first satellite 102(1) determines first upstream data 112(1) associated with the first UT 108(1). The first satellite 102(1) may include logic to separate the second upstream data from the first upstream data. For example, the first satellite 102(1) may include a subtraction module (e.g., subtraction module 416 of FIG. 4B) that removes portions of the received signal to distinguish upstream data 112 between transmitters. The resulting signal may indicate the first upstream data 112(1). The received signal may include characteristics of scheduled message 602 and/or NOMA message 604 described in association with FIG. 6. In some embodiments, block 328 may be performed before 326.

The operations in this figure are shown by way of illustration, and not necessarily as a limitation. For example, operations 314, 318, 320 may be omitted.

Figure 4A:
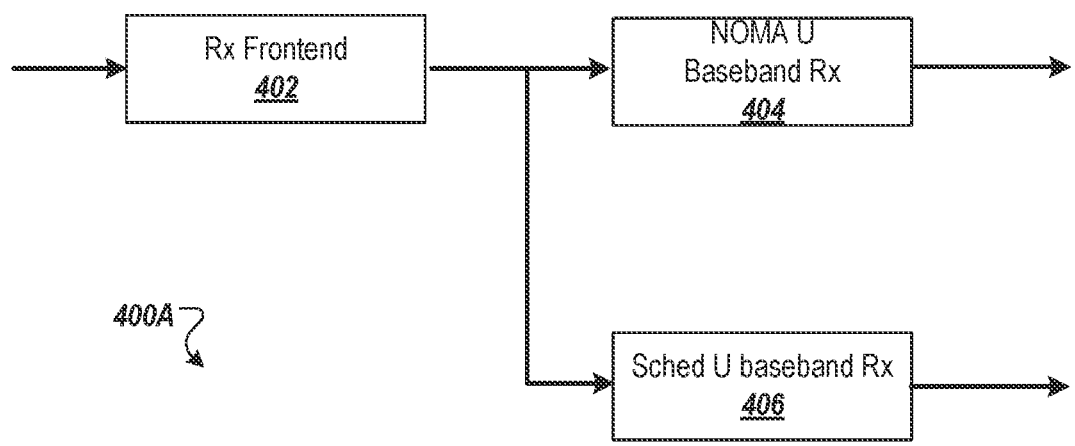
FIGS. 4A-B includes a block diagram illustrating signal receiving circuitry with multiple operation modes including a mode for receiving grant-free overlay transmissions, according to some implementations.
Figure 4B:
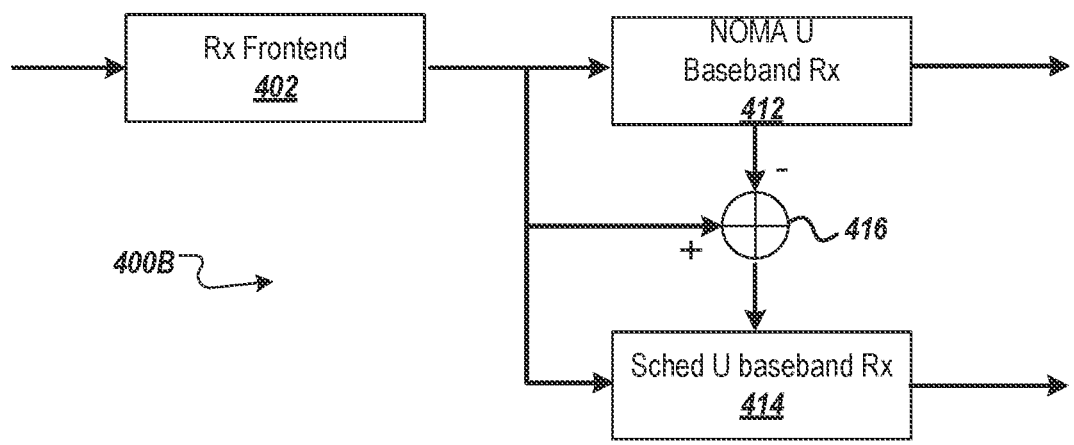

FIGS. 4A-B include a block diagram illustrating signal receiving circuitry 400A-B with multiple operation modes including a mode for receiving grant-free overlay transmissions, according to some implementations. As shown in FIG. 4A-B, receiving circuitry 400A-B includes radio frequency front end (RFFE) circuitry 402 for receiving and preparing the signal for further processing. FIG. 4A illustrates receiving circuitry 400A operating in a receiving configuration. In the receiving configuration, the receiving circuitry 400A alternates between a NOMA phase and a scheduled phase by alternating connecting to a NOMA user baseband receiver 404 and a scheduled user baseband receiver 406. In the FIG. 4A configuration, the receiving circuitry may default to using the NOMA receiver 404 to listen for NOMA signal (e.g., SBDS) front one or more UTs on the network. The receiving circuitry transitions to the scheduled receiver when a grant for resources is fulfilled, and a signal is received pursuant to the granted resources.

As shown in FIG. 4B, receiving circuitry 400B includes a receiver front end 402, a NOMA user baseband receiver 412, a scheduled user baseband receiver 414, and a subtraction module. In receiving circuitry 400B, the NOMA user baseband receiver 412 and the user baseband receiver 414 are linked through the subtraction module 416.

In operation, an incoming overlaid signal is received by receiver front end 402 and provided to NOMA user baseband receiver 412. The NOMA user baseband receiver 412 identifies NOMA users (e.g., UT 108(2) s) (e.g., using near orthogonal preambles as discussed herein). The identified users and corresponding signals are provided to the subtraction module 416 and subtracted from the overlaid signal. In some embodiments, the signals corresponding to various UTs are subtracted one-by-one. For example, signals associated with multiple UT 108(2) s are identified with the strongest signal first (e.g., largest signal-to-noise ratio (SNR)) and are subtracted from the originally received overlaid signal one-by-one. The resulting signal is brought to the scheduled user baseband receiver 414. The scheduled user baseband receiver 414 decodes the signal and identifies the data corresponding to the scheduled user.

In some embodiments, the configuration of the NOMA user baseband receiver and the scheduled user baseband receiver 414 are performed in reverse. For example, the scheduled user baseband receiver 414 processes the incoming signal first, decodes the scheduled signal, and provides the signal to the subtraction module 416 where the scheduled user is subtracted from the original signal first. The NOMA user baseband receiver 412 processes the remaining signal and identifies signals associated with individual NOMA users. The NOMA user baseband receiver 412 iteratively processes individual NOMA signals and subtracts the corresponding signal until all NOMA signals have been processed. The NOMA user baseband receiver 412 may include one or more features, aspects, and/or details of NOMA baseband receiver 500 of FIG. 5 discussed below.

Figure 5:
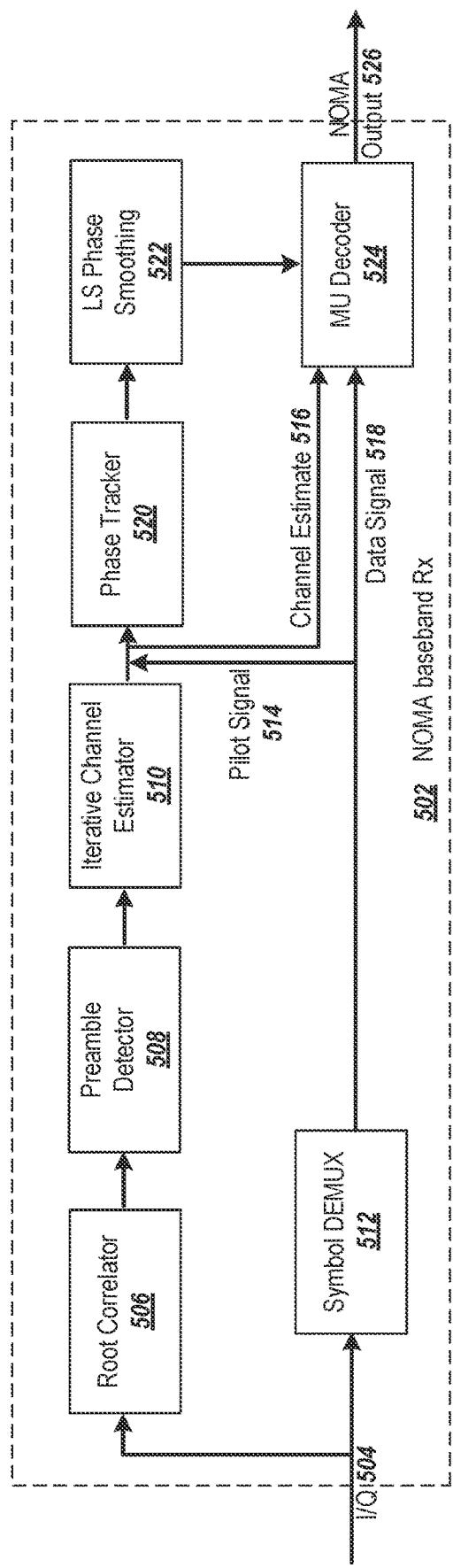
FIG. 5 illustrates circuitry for a NOMA baseband receiver for receiving grant-free transmissions, according to some implementations.

FIG. 5 illustrates circuitry for a NOMA baseband receiver 502 for receiving grant-free transmissions, according to some implementations. The NOMA baseband receiver 500 may include one or more features, aspects, and/or details of NOMA user baseband receiver 412 and/or 404 of FIG. 4. As shown in FIG. 5, the NOMA baseband Receiver receives in-phase and quadrature (I/Q) data 504 corresponding to a received RF signal. The I/Q data 504 indicates signal data associated with a signal made up of a scheduled user signal and one or more NOMA user signals, as discussed herein. For example, the I/Q data 504 may include signal data representing a scheduled message 602 and one or more NOMA messages 604 as discussed below with FIG. 6.

As shown in FIG. 5, the NOMA baseband receiver 502 includes, along a first processing branch, a root correlator 506, a preamble detector 508, and an iterative channel estimator 510. The root correlator 506 receives I/Q data 504 and correlates it with a root sequence, while the correlator output is fed to a preamble detector for further processing.

The preamble detector 508 receives outputs from the root correlator 506 and identifies one or more preambles associated with one or more NOMA user signals (e.g., UTs transmitting using a NOMA signal). The preamble may include one or more aspects, features, and/or details of preambles identified and described in association with FIG. 6. Each preamble of the signal may be near orthogonal to other signal (e.g., from another NOMA UT). For example, one or more preambles may include a near-orthogonal sequence such as an extended or a truncated version of a Zadoff-Chu sequence.

The iterative channel estimator 510 estimates one or more channels associated with the one or more NOMA signals received as a part of the received I/Q data 504. The channel estimation error may be dominated by multi-user interference (e.g., due to non-ideal correlation). Each UT channel may be modulated by one or more signal parameters. For example, a first subcarrier may be modulated by amplitude, phase slope, and carrier phase. The iterative channel estimator 510 may perform iterations for a given channel estimation. In each iteration, a channel estimation is refined by subtracting the interference from other users. In some embodiments, a channel estimation may be further refined by leveraging time domain windowing. For example, an extended smoothing window may use with each modulated signal to reduce noise, side lobes, and/or increase signal resolution.

As shown in FIG. 5, the NOMA baseband receiver includes a symbol demultiplexer. The symbol demultiplexer 512 de-multiplexes symbols in the I/Q data 504 to obtain a data signal 518.

The phase tracker 520 receives output from the iterative channel estimator 510 and instructions based of the data signal 518 in the form of pilot signal 514. The phase tracker may identify features associated with phase within the received channel estimations. For example, phase tracker 520 may track and/or otherwise indicate to downstream processes phase slope and carrier phase of the corresponding signals. The pilot signal 514 may be used to instruct the phase tracker on which phases to identify or scan for a provided channel estimation based on the demodulated data signal 518. Least squares (LS) phase smoothing 522 may be performed on the channel estimation process by the phase tracker 520. LS phase smoothing 522 may include identifying a trend or pattern in the signal data and reducing the noise within the signal. For example, LS smoothing may be performed to identify a signal pattern that can be leveraged to more accurately identify phase data, among other things.

The multiuser (MU) decoder 524 receives the data signal 518. The MU decoder 524 decodes the data signal 518 to generate individual NOMA output 526. The MU decoder may leverage channel estimate 516 and data signal 518 to identify divisions of the data signal 518 associated with individual UTs (e.g., one or more NOMA UTs). The MU Decoder 524 may determine a signal associated with an individual NOMA UT. Data from the phase tracker 520 and LS phase smoothing 522 may be received and leveraged to filter and/or otherwise modify the data signal 518 to identify portions of the data signal associated with a particular UT (e.g., one matching a designated signal parameters such as phase, amplitude, phase slope, and carrier phase).

The NOMA data 526 may indicate digital data associated with one or multiple NOMA UTs. If K NOMA UTs transmit at the same time, the signal 526 should contain L decoded signals corresponding. When NOMA decoding is correct (high probability), L should be equal to K and the K decoded signals should match with the K transmitted signals.

Figure 6:
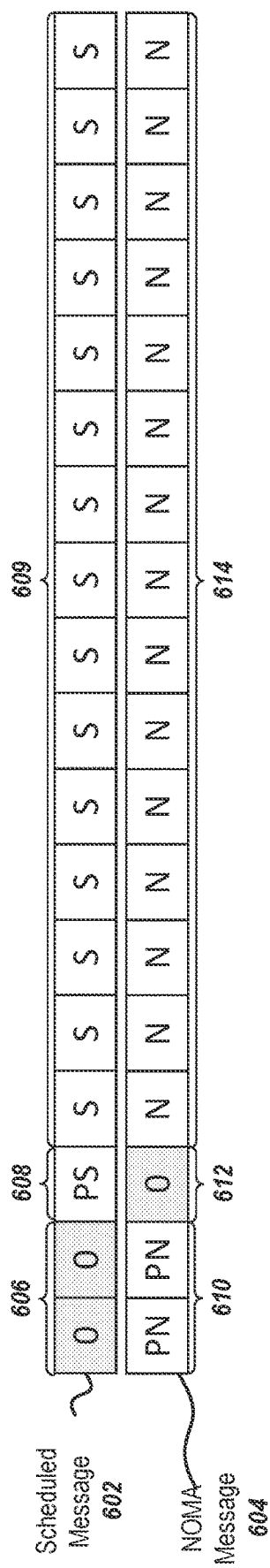
FIG. 6 illustrates a message from various communication terminals (CTs), according to some embodiments.

FIG. 6 illustrates a message format from various communication terminals (CTs) (e.g., user terminals (UTs)), according to some embodiments. UTs may be classified as scheduled UTs and NOMA UTs. A scheduled UT may include a UT to whom a grant of resources has been provided for a current data transfer. A NOMA UT indicates a UT to whom a grant of resources has not been provided for a current data transfer, however, is communicating within resources granted to another UT (e.g., the scheduled UT). A NOMA UT may overlay a message onto a scheduled UTs message that is received in combination by a receiver. One or more UTs may know or otherwise communicate to account for a known distance from the UT to the corresponding receiver (e.g., Satellite) such the overlaid messages are received in temporal consistency one with another (e.g., in phase, symbol are alignment, etc.).

FIG. 6 illustrates exemplary message formats for scheduled upstream message 602 (e.g., transmitted by a scheduled UT) and an overlaid non-orthogonal multiple access (NOMA) message 604 (e.g., transmitted by a NOMA UT), according to some implementations. In the implementations shown here, the scheduled message 602 and the NOMA message 604 include time-frequency resources that are displayed in the time domain as including a data stream having 18 symbols. In some embodiments, the exact number of symbols employed may vary. For example, a scheduled message and a NOMA message may include greater or less than 18 symbols, but may include a proper size such as to be capable of being overlaid one signal to another (e.g., have the same number of symbols). In some embodiments, the symbols may be generated and/or otherwise associated with signal modulation. In the frequency domain, the messages may be encoded into upwards of 144 subcarriers. The exact number of subcarriers may vary based on the number of individual symbol groups, the number of total symbols used in the message, modulation scheme, and so on.

In some embodiments, the symbols used to generate digitally encoded RF signals using one or more digital modulation schemes. In embodiments, the scheduled message 602 and/or the NOMA message 604 includes symbols used in association with orthogonal frequency division multiplexing (OFDM). OFDM is a digital multi-carrier modulation scheme that extends the concept of single subcarrier modulation by using multiple subcarriers within the same single channel. Rather than transmit a high-rate stream of data with a single subcarrier, OFDM makes use of a large number of closely-spaced orthogonal subcarriers that are transmitted in parallel. Each subcarrier may be modulated with a conventional digital modulation scheme (such as quadrature phase shift keying (QPSK), 16QAM, etc.) at a symbol rate, T. However, the combination of many subcarriers enables data rates similar to conventional single-carrier modulation schemes within equivalent bandwidths. In some embodiments, one or more of scheduled message 602 and/or one or more NOMA messages may leverage sparse spreading OFDM. Sparse spreading OFDM may include multiple subcarriers where some overlapping subcarriers are intentionally not leveraged to reduce congestions within the overlaid signal.

In some embodiments, the scheduled message 602 and/or NOMA message 604 include symbols associated with modulation (QAM). QAM includes generating a signal in which two carriers are shifted in phase by 90 degrees (e.g., sine and cosine) are modulated and combined. As a result of the phase difference, the phase shifted carriers are in quadrature one with the other. Each of the signals includes a symbol rate, associated with a rate (e.g., frequency), the digital symbols occur within the QAM signal.

As shown in FIG. 6, the scheduled message 602 includes a first symbol group 606. The first symbol group 606 of the scheduled message 602 may include empty symbols or symbol that does not transmit any information, nor do they interfere with contemporaneous symbols of other coexisting signals. The scheduled message 602 includes a second group of symbols 608 that include a preamble (e.g., preamble schedule (PS)). The preamble may be leveraged to identify the scheduled user when received by a receiver (e.g., the receiver of satellite 102(1)). The scheduled message 602 includes a third symbol group 609 corresponding to a payload of the scheduled user's message. The payload may include upstream data that is to be communicated to the receiver (e.g., satellite 102).

As shown in FIG. 6, the NOMA message 604 includes a first symbol group 610. The first symbol group 610 may include a preamble (e.g., preamble NOMA (PN)) associated with the UT sending the NOMA message. The first symbol group 610 aligns with the first symbol group 606 of the schedule message 602. The NOMA message 604 includes a second symbol group 612 that includes empty symbols that do not transmit any information, nor do they interfere with contemporaneous symbols of other coexisting signals. The second symbol group 612 of the NOMA message 604 aligns with the second symbol group 608 of the scheduled message. The NOMA message 604 further includes a third symbol group 614. The third symbol group corresponds to a payload of the NOMA message 604.

In some embodiments, the schedule message 602 and the NOMA message 604 can stack on top each other. FIG. 6 illustrates an example having one schedule message 602 with one NOMA message. However, in some embodiments, one schedule message 602 may be overlaid by a variety of NOMA messages (e.g., from a selection of UTs). Each of the selection of messages may be overlaid to generate a combined signal at the receiver (e.g. Satellite). For example, if there are two NOMA UTs, then a schedule message 602 may be combined with a first NOMA message and a second NOMA following an analogous setup. The various message can be differentiated at a receiver (e.g., using operation modes described in association with FIG. 4 and/or signal decoding procedures discussed in associated with FIG. 5).

In some embodiments, one or more preambles of the scheduled message 602 and/or one or more NOMA messages include orthogonal and/or near orthogonal data sequences. For example, the preambles may be associated with and/or otherwise incorporate a Zadoff-Chu sequence (e.g., a Zadoff-Chu preamble).

In some embodiments, the schedule message 602 and/or one or more NOMA messages include one or more convolution codes. A convolution code includes a type of error-correcting logic that generates parity symbols via the sliding application of a function to a data stream. The sliding application can represent a convolution of the encoder over the data. For example, the schedule message 602 and/or one or more NOMA messages may include one or more tail-biting convolutional codes (TBCC).

FIG. 7A illustrate a table 700A that indicates parameter specification associated with schedule messages and NOMA messages, according to some implementations. The various columns 720 of table 700A indicate different modulation schemes and the rows indicate corresponding parameters associated with those modulation schemes. Row 710 indicates a number of NOMA OFDM symbols used per message. Row 712 indicates a number of cyclic redundancy check (CRC) bits. Row 714 indicates a number of subcarriers leveraged per symbol. Row 716 indicates a number of payload bytes used per messages. The various modulation schemes indicated in the columns 720 are purely exemplary and other combinations of signal transmission parameters may be leveraged in addition to or alternative to the specific specifications outlined in FIG. 7A.

FIG. 7B illustrates table 700B that indicates a parameter specification comparison between NOMA signal communication with and without grant-free overlay transmission, according to some implementations. The various columns 750 of table 700B indicate different modulation schemes (e.g., corresponding to modulation schemes identified in table 700A), and the rows indicate corresponding parameters and improvements factors over NOMA systems not leveraging grant-free overlay transmissions. Row 762 indicates payload bytes leverages per message. Row 764 indicates improvement factors corresponding to raw throughput whose evaluation does not include considering the preamble. Row 766 indicates and improvement factors corresponding to net throughput whose evaluation does consider the preamble.

Figure 8:
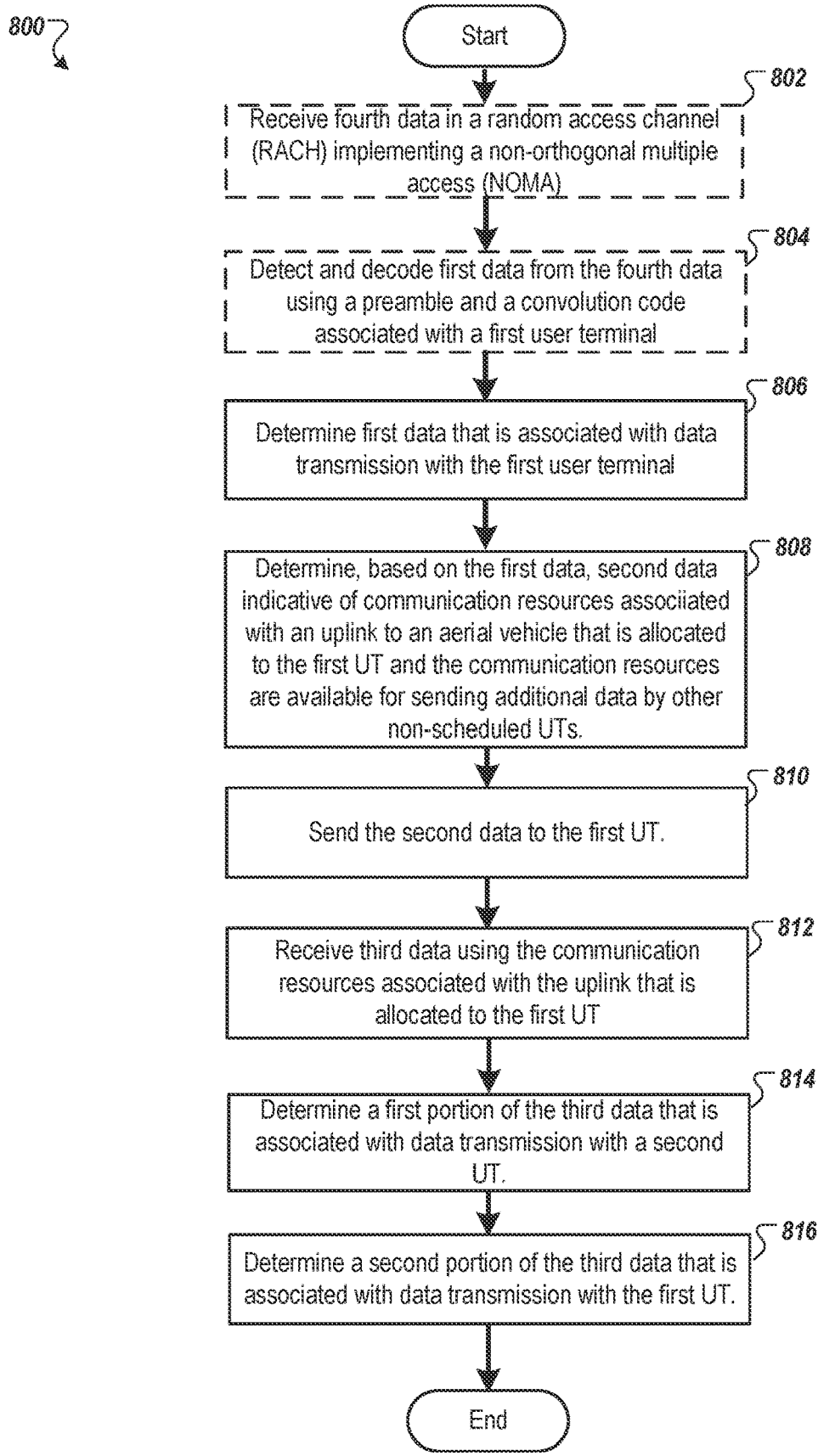
FIG. 8 is a flow diagram of a method for performing grant-free overlay transmission, according to one embodiment.

FIG. 8 is a flow diagram of a method for performing grant-free overlay transmission, according to one embodiment. Method 800 may be performed by processing elements that may comprise hardware (circuitry, dedicated logic, etc.), software (such as run on a general purpose computer system or a dedicated machine) or any combination thereof. In one implementation, the method is performed by one or more of satellite 102, ground station 106, and user terminal 108 of FIG. 1, and/or other aspects, components, and/or features described herein, while in some other implementations, one or more blocks of FIG. 8 may be performed by one or more other machines not depicted in the figures.

At block 802, processing logic optionally receives fourth data in a random access channel (RACH) implementing non-orthogonal multiple access (NOMA).

At block 804, processing logic optionally detects and decodes first data from the fourth data using a preamble and a convolution code associated with a first user terminal (UT). The first data may include an SBDS.

At block 806, processing logic determines first data that is associated with data transmission with the first UT.

At block 808, processing logic determines, based on the first data, second data indicating communication resources associated with an uplink to an aerial vehicle that is allocated to the first UT, and the communication resources are available for sending additional data by other non-scheduled UTs. In some embodiments, the aerial vehicle is a satellite. For example, responsive to determining the second data, a resource scheduler onboard the satellite may issue a grant. The grant specifies communication resources for the uplink that are assigned to the UT, such as a timeslot, frequency slot, modulation, coding scheme, and so forth.

At block 810, processing logic sends the second data to the first UT. At block 812, processing logic receives third data using the communication resources associated with the uplink that is allocated to the first UT. The third data may include a signal having portions attributed to one or more different UTs.

At block 814, processing logic determines a first portion of the third data that is associated with data transmission with a second UT. Determining the first portion may include detecting a first preamble in the third data. Processing logic may determine, using the first preamble, a first set of parameters indicative of a channel estimation error of a channel between the second UT and the aerial vehicle. Processing logic may further de-multiplex symbols in the third data to obtain a data signal. Processing logic may further determine the first portion of the third data by decoding the data signal using the first set of parameters. The first set of parameters may include an amplitude, a phase slope, and a carrier phase of a first subcarrier.

In some embodiments, to determine the first portion of the third data, the processing device detects a pilot signal in the third data. The processing device determines phase information using the first set of parameters and the pilot signal and adjusts the decoding of the signal using the phase information. For example, the processing device may determine an adjustment value that indicates an amount of adjustment needed to decode the data signal. The decoding the data signal may include decoding the data signal using the first set of parameters and the adjustment value.

At block 816, processing logic determines a second portion of the third data that is associated with data transmission with the first UT. In some embodiments, processing logic subtracts the first portion from the third data. The remaining signal may correspond to the first UT. In some embodiments, more than one UT overlay a signal within the third data, and processing associated with block 814 is performed for each portion of the third data associated with a different UT.

Figure 9:
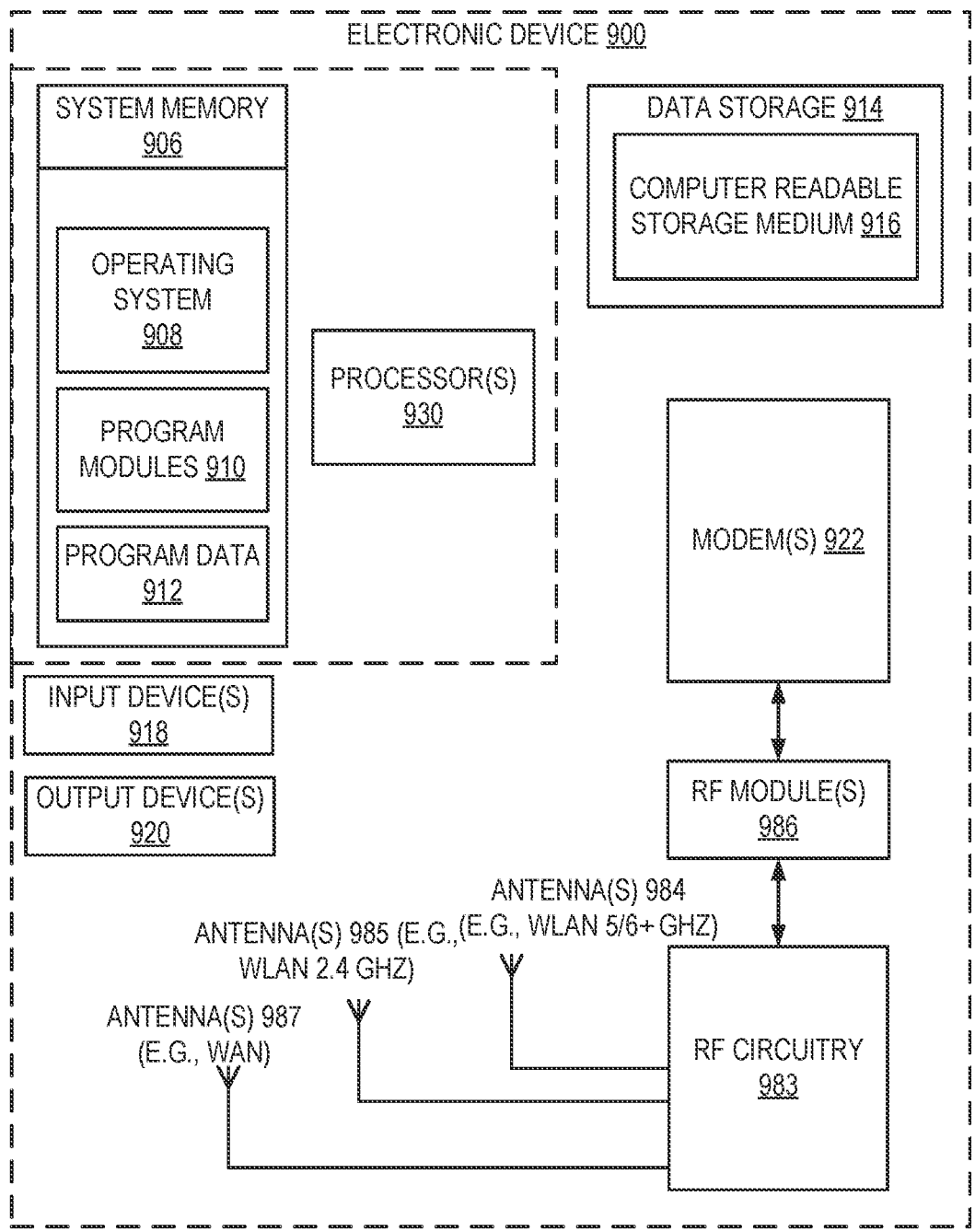
FIG. 9 is a block diagram of an electronic device (e.g., user terminal), according to one embodiment.

FIG. 9 is a block diagram of an electronic device 900 (e.g., user terminal), according to one embodiment. The electronic device 900 may correspond any of ground station 106, user terminal 108, and/or satellite 102, as shown in FIG. 1. Alternatively, the electronic device 600 may be other electronic devices, as described herein.

The electronic device 900 includes one or more processor(s) 930, such as one or more CPUs, microcontrollers, field-programmable gate arrays, or other types of processors. The electronic device 900 also includes system memory 906, which may correspond to any combination of volatile and/or non-volatile storage mechanisms. The system memory 906 stores information that provides operating system component 908, various program modules 910, program data 912, and/or other components. The program modules 910 may include instructions of the device interference detection module 962. In one embodiment, the system memory 906 stores instructions of methods to control the operation of the electronic device 900. The electronic device 900 performs functions by using the processor(s) 930 to execute instructions provided by the system memory 906.

The electronic device 900 also includes a data storage device 914 that may be composed of one or more types of removable storage and/or one or more types of non-removable storage. The data storage device 914 includes a computer-readable storage medium 916 on which is stored one or more sets of instructions embodying any of the methodologies or functions described herein. Instructions for the program modules 910 may reside, completely or at least partially, within the computer-readable storage medium 916, system memory 906 and/or within the processor(s) 930 during execution thereof by the electronic device 900, the system memory 906 and the processor(s) 930 also constituting computer-readable media. The electronic device 900 may also include one or more input devices 918 (keyboard, mouse device, specialized selection keys, etc.) and one or more output devices 920 (displays, printers, audio output mechanisms, etc.).

The electronic device 900 further includes a modem 922 to allow the electronic device 900 to communicate via wireless connections (e.g., such as provided by the wireless communication system) with other computing devices, such as remote computers, an item providing system, and so forth. The modem 922 can be connected to one or more RF modules 986. The RF modules 986 may be a WLAN module, a WAN module, a personal area network (PAN) module, a GPS module, or the like. The antenna structures (antenna(s) 984, 985, and 987) are coupled to the RF circuitry 983, which is coupled to the modem 922. The RF circuitry 983 may include radio front-end circuitry, antenna switching circuitry, impedance matching circuitry, or the like. The antennas 984 may be GPS antennas, NFC antennas, other WAN antennas, WLAN or PAN antennas, or the like. The modem 922 allows the electronic device 600 to handle both voice and non-voice communications (such as communications for text messages, multimedia messages, media downloads, web browsing, etc.) with a wireless communication system. The modem 922 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 922 may generate signals and send these signals to antenna(s) 984 of a first type (e.g., WLAN 5/6+ GHz), antenna(s) 985 of a second type (e.g., WLAN 2.4 GHz), and/or antenna(s) 987 of a third type (e.g., WAN), via RF circuitry 983, and RF module(s) 986 as described herein. Antennas 984, 985, and 987 may be configured to transmit in different frequency bands and/or using different wireless communication protocols. The antennas 984, 985, and 987 may be directional, omnidirectional, or non-directional antennas. In addition to sending data, antennas 984, 985, and 987 may also receive data, which is sent to appropriate RF modules connected to the antennas. One of the antennas 984, 985, 987 may be any combination of the antenna structures described herein.

In one embodiment, the electronic device 900 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna.

Though a modem 922 is shown to control transmission and reception via antenna (984, 985, 987), the electronic device 900 may alternatively include multiple modems, each of which is configured to transmit/receive data via a different antenna and/or wireless transmission protocol.

Figure 10:
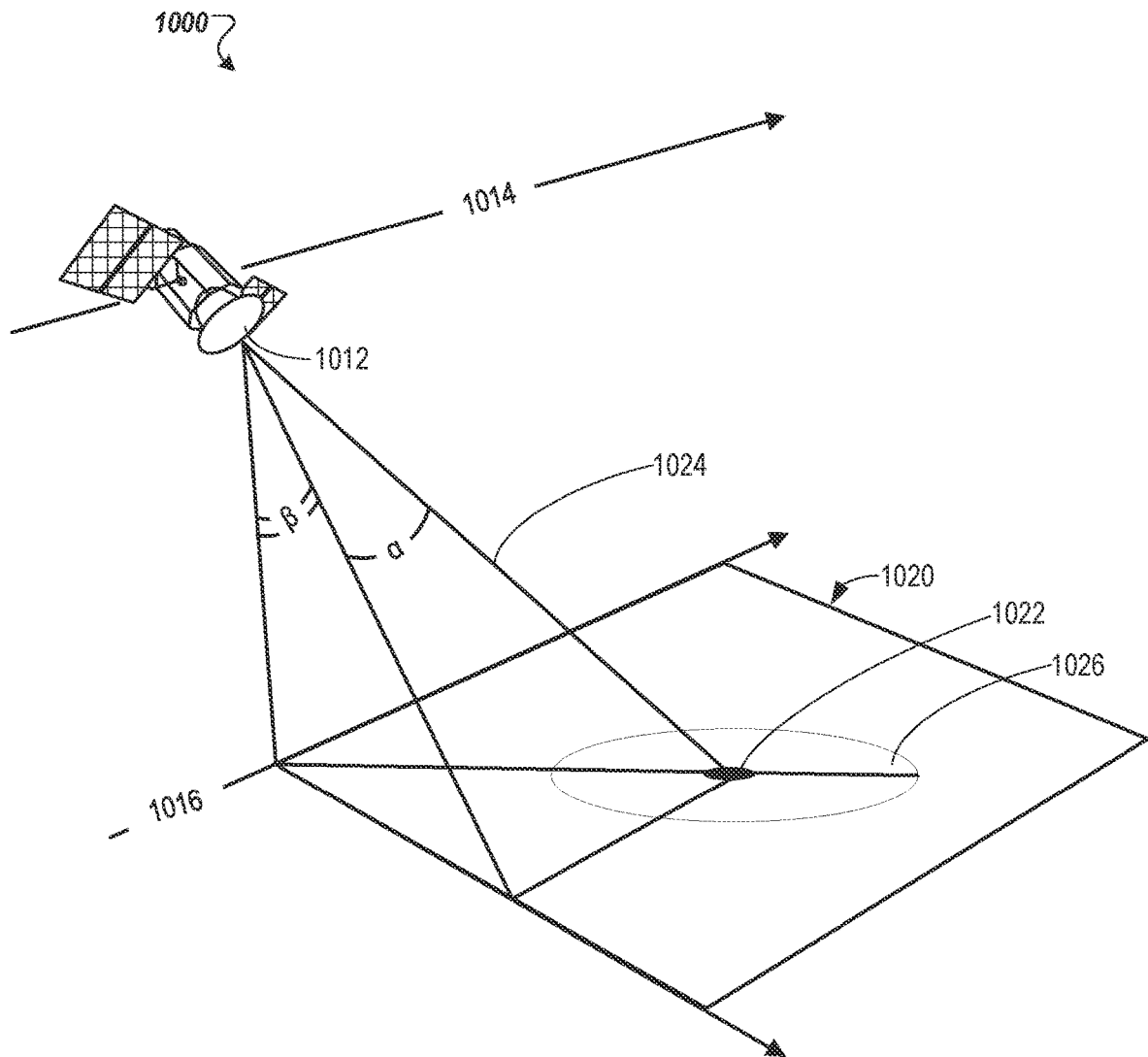
FIG. 10 illustrates the satellite including an antenna system that is steerable according to embodiments of the present disclosure.

FIG. 10 illustrates the satellite 1000 including an antenna system 1012 that is steerable according to embodiments of the present disclosure. The satellite 1000 can include the one or more aspects of system 100B of FIG. 1B, as well as other communication devices described herein. The antenna system 1012 may include multiple antenna elements that form an antenna and that can be mechanically or electrically steered individually, collectively, or a combination thereof. In an example, the antenna is a phased array antenna.

In orbit 104, the satellite 1000 follows a path 1014, the projection of which onto the surface of the Earth forms a ground path 1016. In the example illustrated in FIG. 10, the ground path 1016 and a projected axis extending orthogonally from the ground path 1016 at the position of the satellite 1000, together define a region 1020 of the surface of the Earth. In this example, the satellite 1000 is capable of establishing uplink and downlink communications with one or more of ground stations, user terminals, or other devices within the region 1020. In some embodiments, the region 1020 may be located in a different relative position to the ground path 1016 and the position of the satellite 1000. For example, the region 1020 may describe a region of the surface of the Earth directly below the satellite 1000. Furthermore, embodiments may include communications between the satellite 1000, an airborne communications system, and so forth.

As shown in FIG. 10, a communication target 1022 (e.g., a ground station, a user terminal, or a CT (such as an HD CT)) is located within the region 1020. The satellite 1000 controls the antenna system 1012 to steer transmission and reception of communications signals to selectively communicate with the communication target 1022. For example, in a downlink transmission from the satellite 1000 to the communication target 1022, a signal beam 1024 emitted by the antenna system 1012 is steerable within an area 1026 of the region 1020. In some implementations, the signal beam 1024 may include multiple subbeams. The extents of the area 1026 define an angular range within which the signal beam 1024 is steerable, where the direction of the signal beam 1024 is described by a beam angle "α" relative to a surface normal vector of the antenna system 1012. In two-dimensional phased array antennas, the signal beam 1024 is steerable in two dimensions, described in FIG. 10 by a second angle "β" orthogonal to the beam angle α. In this way, the area 1026 is a two-dimensional area within the region 1020, rather than a linear track at a fixed angle determined by the orientation of the antenna system 1012 relative to the ground path 1016.

In FIG. 10, as the satellite 1000 follows the path 1014, the area 1026 tracks along the surface of the Earth. In this way, the communication target 1022, which is shown centered in the area 1026 for clarity, is within the angular range of the antenna system 1012 for a period of time. During that time, signals communicated between the satellite 1000 and the communication target 1022 are subject to bandwidth constraints, including but not limited to signal strength and calibration of the signal beam 1024. In an example, for phased array antenna systems, the signal beam 1024 is generated by an array of mutually coupled antenna elements, wherein constructive and destructive interference produce a directional beam. Among other factors, phase drift, amplitude drift (e.g., of a transmitted signal in a transmitter array), and so forth affect the interference properties and thus the resultant directional beam or subbeam.

Figure 11:
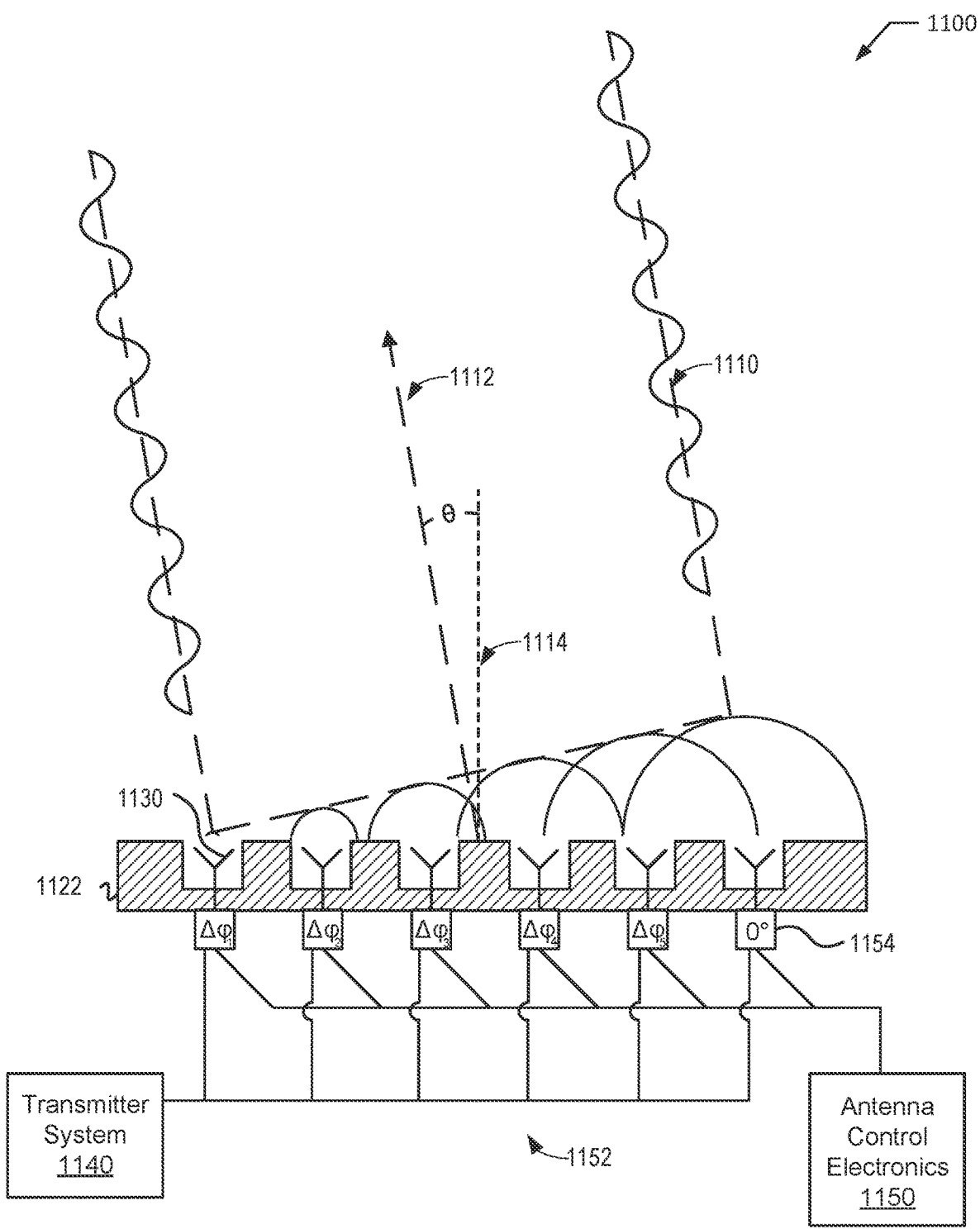
FIG. 11 illustrates a simplified schematic of an antenna, according to embodiments of the present disclosure.

FIG. 11 illustrates a simplified schematic of an antenna 1100, according to embodiments of the present disclosure. The antenna 1100 may be a component of the antenna system 1012 of FIG. 10. As illustrated, the antenna 1100 is a phased array antenna that includes multiple antenna elements 1103. Interference between the antenna elements 1130 forms a directional radiation pattern in both transmitter and receiver arrays forming a beam 1110 (beam extents shown as dashed lines). The beam 1110 is a portion of a larger transmission pattern (not shown) that extends beyond the immediate vicinity of the antenna 1100. The beam 1110 is directed along a beam vector 1112, described by an angle "0" relative to an axis 1114 normal to a surface of the antenna 1100. As described below, the beam 1110 is one or more of steerable or shapeable through control of operating parameters including, but not limited to a phase and an amplitude of each antenna element 1130.

In FIG. 11, the antenna 1100 includes, within a transmitter section 1122, the antenna elements 1130, which may include, but are not limited to, omnidirectional transmitter antennas coupled to a transmitter system 1140, such as the downlink transmitter 278. The transmitter system 1140 provides a signal, such as a downlink signal to be transmitted, to a ground station on the surface. The downlink signal is provided to each antenna element 1130 as a time-varying signal that may include several multiplexed signals. To steer the beam 1110 relative to the axis 1114, the phased array antenna system 1100 includes antenna control electronics 1150 controlling a radio frequency (RF) feeding network 1152, including multiple signal conditioning components 1154 interposed between the antenna elements 1130 and the transmitter system 1140. The signal conditioning components 1154 introduce one or more of a phase modulation or an amplitude modulation, as denoted by "Ay" in FIG. 11, to the signal sent to the antenna elements 1130. As shown in FIG. 11, introducing a progressive phase modulation produces interference in the individual transmission of each antenna element 1130 that generates the beam 1110.

The phase modulation imposed on each antenna element 1130 can differ and can be dependent on a spatial location of a communication target that determines an optimum beam vector (e.g., where the beam vector 1112 is found by one or more of maximizing signal intensity or connection strength). The optimum beam vector may change with time as the communication target 1022 moves relative to the phased array antenna system 1100.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:
    determining, by a communication system, first data that is associated with data transmission between the communication system and a first user terminal (UT);
    determining, by the communication system based on the first data, second data indicative of communication resources associated with an uplink to the communication system, wherein the uplink is allocated to the first UT, and wherein the communication resources are available for sending additional data by other UTs;
    sending, by the communication system, the second data to the first UT;
    receiving, by the communication system, third data using the communication resources associated with the uplink, wherein the third data comprises a first portion of data overlaid with a second portion of data;
    identifying the first portion of the third data that is associated with data transmission by a second UT;
    identifying the second portion of the third data that is associated with data transmission by the first UT;
    wherein:
        the first portion comprises first encoded information uniquely identifying the second UT;
        the second portion comprises second encoded information uniquely identifying the first UT; and
        the first encoded information is distinct from the second encoded information.

2. The method of claim 1, further comprising:
    receiving fourth data in a random access channel (RACH) as a part of a non-orthogonal multiple access (NOMA) communication scheme implemented by the communication system; and
    extracting the first data from the fourth data using unique identifying information and a convolution code associated with the first UT.

3. The method of claim 1, wherein determining the first portion of the third data comprises:
    detecting the first encoded information in the third data;
    determining, using the first encoded information, a first set of parameters indicative of a communication channel between the second UT and the communication system;
    obtaining a data stream corresponding to the third data; and
    determining the first portion of the third data by decoding the data stream using the first set of parameters.

4. The method of claim 3, wherein determining the first portion of the third data further comprises:
    detecting a pilot signal in the third data;
    determining phase information using the first set of parameters and the pilot signal; and
    using the phase information in the decoding.

5. The method of claim 3, wherein determining the second portion of the third data comprises subtracting at least the first portion from the third data to obtain the second portion.

6. The method of claim 3, wherein the first set of parameters comprises a carrier phase of a first subcarrier, an amplitude, and a phase slope.

7. The method of claim 1, wherein the communication system is a communication system of an artificial satellite.

8. A communication system comprising:
    a network interface; and
    one or more processors executing instructions to:
        determine first data that is associated with data transmission between the communication system and a first user terminal (UT);
        determine, based on the first data, second data indicative of communication resources associated with an uplink to the communication system, wherein the uplink is allocated to the first UT, and wherein the communication resources are available for sending additional data by other UTs;
        send the second data to the first UT using the network interface;
        receive, using the network interface, third data using the communication resources associated with the uplink, wherein the third data comprises a first portion of data overlaid with a second portion of data;

identify the first portion of the third data that is associated with data transmission by a second UT; and identify the second portion of the third data that is associated with data transmission by the first UT;

wherein:
the first portion comprises first encoded information uniquely identifying the second UT;
the second portion comprises second encoded information uniquely identifying the first UT; and
the first encoded information is distinct from the second encoded information.

9. The communication system of claim 8, the one or more processors executing instructions further to:

receive fourth data in a random access channel (RACH) as part of a non-orthogonal multiple access (NOMA) communication scheme implemented by the communication system; and extract the first data from the fourth data using unique identifying information and a convolution code associated with the first UT.

10. The communication system of claim 8, wherein to determine the first portion of the third data the one or more processors further:

detect the first encoded information in the third data;

determine, using the first encoded information, a first set of parameters indicative of a communication channel between the second UT and the communication system;

obtain a data stream corresponding to the third data; and determine the first portion of the third data by decoding the data stream using the first set of parameters.

11. The communication system of claim 10, wherein to determine the first portion of the third data the one or more processors further:

detect a pilot signal in the third data;

determine phase information using the first set of parameters and the pilot signal; and use the phase information in the decoding.

12. The communication system of claim 10, wherein to determine the second portion of the third data the one or more processors subtract at least the first portion from the third data to obtain the second portion.

13. The communication system of claim 10, wherein the first set of parameters comprises a carrier phase of a first subcarrier, an amplitude, and a phase slope.

14. The communication system of claim 8, wherein the communication system is a communication system of an artificial satellite.

15. A method comprising, by a first user terminal (UT):

receiving first data that is associated with data transmission between a satellite and a second UT, the first data being indicative of communication resources allocated to an uplink between the satellite and the second UT;

determining, based on the first data, that the communication resources are available for other UTs to overlay additional data with data transmissions between the satellite and the second UT; and sending second data using the communication resources allocated to the uplink between the satellite and the second UT, wherein the second data comprises first encoded information uniquely identifying the second UT, the first encoded information being distinct from second encoded information that uniquely identifies the first UT.

16. The method of claim 15, wherein the second data comprises third data and a convolution code associated with the first UT.

17. The method of claim 16, wherein the third data includes information about (i) an amplitude, (ii) a phase slope, and (iii) a carrier phase of a carrier corresponding to the second data.

18. The method of claim 15, wherein the second data is sent as a part of a non-orthogonal multiple access (NOMA) communication scheme.

* * * * *